United States Patent
Venditti et al.

(10) Patent No.: US 12,511,646 B2
(45) Date of Patent: *Dec. 30, 2025

(54) SYSTEM AND METHOD FOR MANAGING LOYALTY PROGRAM ACCOUNTS

(71) Applicant: The Toronto-Dominion Bank, Toronto (CA)

(72) Inventors: Alexander Christian Raphael Venditti, Caledon (CA); Jenny Wai Ching Fung-Peloso, Toronto (CA); Jennifer Marie deLagran, Gloucester (CA)

(73) Assignee: The Toronto-Dominion Bank, Toronto (CA)

( * ) Notice: Subject to any disclaimer, the term of this patent is extended or adjusted under 35 U.S.C. 154(b) by 272 days.

This patent is subject to a terminal disclaimer.

(21) Appl. No.: 18/455,230

(22) Filed: Aug. 24, 2023

(65) Prior Publication Data

US 2023/0401569 A1    Dec. 14, 2023

Related U.S. Application Data

(63) Continuation of application No. 17/547,490, filed on Dec. 10, 2021, now Pat. No. 11,775,964, which is a
(Continued)

(51) Int. Cl.
*G06Q 20/36* (2012.01)
*G06Q 20/38* (2012.01)
*G06Q 30/0226* (2023.01)

(52) U.S. Cl.
CPC ....... *G06Q 20/3676* (2013.01); *G06Q 20/387* (2013.01); *G06Q 30/0229* (2013.01)

(58) Field of Classification Search
None
See application file for complete search history.

(56) References Cited

U.S. PATENT DOCUMENTS

| 7,398,225 B2 | 7/2008 | Votmer et al. |
| 7,578,430 B2 | 8/2009 | Michelsen et al. |

(Continued)

FOREIGN PATENT DOCUMENTS

| KR | 10-1945287 | 2/2018 |
| WO | 2018/174813 A1 | 9/2018 |

(Continued)

OTHER PUBLICATIONS

What Is the Rakuten Cash Back Button ?;Rakuten https://www.rakuten.com/help/article/what-is-the-rakuten-cash-back-button-360002116947https://www.rakuten.com/button.htm; Retrieved from the Internet Oct. 10, 2021.

(Continued)

*Primary Examiner* — Allan J Woodworth, II
(74) *Attorney, Agent, or Firm* — CPST Intellectual Property Inc.; Brett J. Slaney; Amy Scouten

(57) ABSTRACT

A system and method are provided for managing loyalty program accounts. The method includes providing, from the device, access to a loyalty wallet application. The method also includes storing loyalty account information for a plurality of loyalty accounts in the loyalty wallet application and integrating a loyalty tracking application, operable from the device, with at least one transaction channel accessed via the device. The method also includes receiving transaction data from the at least one transaction channel; detecting, from the transaction data, that a transaction yet to be executed is eligible for a loyalty reward associated with one or more of the plurality of loyalty accounts; and modifying the transaction to use corresponding loyalty account information to obtain the loyalty reward. The method also includes enabling the modified transaction to be completed to obtain the loyalty reward. Notifications may be determined and sent using a machine learning system.

20 Claims, 17 Drawing Sheets

Related U.S. Application Data continuation-in-part of application No. 17/305,528, filed on Jul. 9, 2021, now abandoned.

(56) References Cited

U.S. PATENT DOCUMENTS

| | | | |
|---|---|---|---|
| 8,538,827 B1* | 9/2013 | Dryer | G06Q 30/00 |
| | | | 705/26.1 |
| 8,660,893 B2 | 2/2014 | Fordyce, III | |
| 8,725,633 B1 | 5/2014 | Bauer et al. | |
| 8,732,013 B2 | 5/2014 | Senghore et al. | |
| 9,990,646 B2 | 6/2018 | Salmon et al. | |
| 10,198,740 B2 | 2/2019 | Badger et al. | |
| 10,223,707 B2 | 3/2019 | Granville, III | |
| 10,304,075 B2 | 5/2019 | Walz et al. | |
| 10,467,647 B2 | 11/2019 | Kim et al. | |
| 10,496,979 B2 | 12/2019 | Taveau et al. | |
| 10,521,820 B1 | 12/2019 | Jarvis et al. | |
| 10,535,077 B2 | 1/2020 | Enriquez et al. | |
| 10,540,675 B2 | 1/2020 | Tietzen et al. | |
| 10,740,768 B2 | 8/2020 | Skowronek et al. | |
| 10,839,366 B2 | 11/2020 | Venkatesan et al. | |
| 10,846,746 B2 | 11/2020 | Windmueller | |
| 10,861,041 B2 | 12/2020 | Tietzen et al. | |
| 10,867,317 B2 | 12/2020 | Ladds et al. | |
| 10,878,398 B2 | 12/2020 | Bloy et al. | |
| 10,878,440 B1 | 12/2020 | Bermudez et al. | |
| 10,942,913 B1 | 3/2021 | Khoyilar et al. | |
| 2002/0082920 A1 | 6/2002 | Austin et al. | |
| 2002/0123926 A1 | 9/2002 | Bushold et al. | |
| 2003/0040964 A1 | 2/2003 | Lacek | |
| 2003/0130895 A1 | 7/2003 | Antonucci | |
| 2005/0071227 A1 | 3/2005 | Hammad et al. | |
| 2005/0144071 A1 | 6/2005 | Monahan et al. | |
| 2006/0253320 A1 | 11/2006 | Heywood | |
| 2008/0133351 A1 | 6/2008 | White et al. | |
| 2008/0210753 A1* | 9/2008 | Plozay | G06Q 30/02 |
| | | | 705/14.27 |
| 2010/0082420 A1 | 4/2010 | Trifiletti et al. | |
| 2010/0106570 A1 | 4/2010 | Radu et al. | |
| 2012/0053987 A1 | 3/2012 | Satyavolu | |
| 2012/0101881 A1 | 4/2012 | Taylor et al. | |
| 2013/0036001 A1 | 2/2013 | Wegner et al. | |
| 2013/0103484 A1 | 4/2013 | Mclaughlin | |
| 2013/0124263 A1 | 5/2013 | Amaro et al. | |
| 2013/0246151 A1* | 9/2013 | Raghavan | G06Q 30/0227 |
| | | | 705/14.27 |
| 2013/0325579 A1 | 12/2013 | Salmon et al. | |
| 2014/0180826 A1 | 6/2014 | Boal | |
| 2015/0149272 A1 | 5/2015 | Salmon et al. | |
| 2015/0170180 A1 | 6/2015 | Itwaru | |
| 2015/0235256 A1* | 8/2015 | Barsoum | G06Q 20/02 |
| | | | 705/14.33 |
| 2015/0348083 A1 | 12/2015 | Brill | |
| 2016/0048864 A1 | 2/2016 | Beer | |
| 2016/0071140 A1 | 3/2016 | Sherman | |
| 2016/0078466 A1 | 3/2016 | Markowitz | |
| 2017/0024724 A1* | 1/2017 | Kwak | G06Q 20/34 |
| 2017/0024759 A1 | 1/2017 | Taneja et al. | |
| 2017/0278125 A1 | 9/2017 | Tietzen et al. | |
| 2018/0268401 A1 | 9/2018 | Ortiz | |
| 2018/0276710 A1 | 9/2018 | Tietzen et al. | |
| 2018/0293573 A1 | 10/2018 | Ortiz et al. | |
| 2019/0108542 A1 | 4/2019 | Durvasula et al. | |
| 2019/0180310 A1 | 6/2019 | Jones | |
| 2019/0180311 A1 | 6/2019 | Chan et al. | |
| 2019/0197575 A1 | 6/2019 | Ladds | |
| 2020/0051112 A1 | 2/2020 | Nelson et al. | |
| 2020/0082427 A1 | 3/2020 | Gleeson et al. | |
| 2020/0104825 A1* | 4/2020 | Khan | H04W 4/80 |
| 2020/0126107 A9 | 4/2020 | Shah et al. | |
| 2020/0134657 A1 | 4/2020 | Darmo et al. | |
| 2020/0234327 A1 | 7/2020 | Salloum | |
| 2020/0242669 A1 | 7/2020 | Carroll et al. | |
| 2020/0279288 A1 | 9/2020 | Song | |
| 2021/0150560 A1 | 5/2021 | Gupta et al. | |
| 2021/0166260 A1 | 6/2021 | Ho | |
| 2021/0377260 A1 | 12/2021 | Phillips | |
| 2022/0391938 A1 | 12/2022 | Sridhar | |

FOREIGN PATENT DOCUMENTS

| | | |
|---|---|---|
| WO | 2020/167614 A1 | 8/2020 |
| WO | 2021/067949 A1 | 4/2021 |

OTHER PUBLICATIONS

U.S. Appl. No. 17/547,490, filed Dec. 10, 2021.
U.S. Appl. No. 17/305,528, filed Jul. 9, 2021.

* cited by examiner

| Loyalty Alert | Trigger | Alert Location |
|---|---|---|
| Missing info | Detect empty field | Payment page |
| Other channel | Reward differential | Any transaction page |
| Payment card | Card X not being used | Payment page |
| | | |
| | | |
| | | |
| | | |
| | | |

FIG. 4

SYSTEM AND METHOD FOR MANAGING LOYALTY PROGRAM ACCOUNTS

CROSS-REFERENCE TO RELATED APPLICATIONS

This application is a Continuation of U.S. patent application Ser. No. 17/547,490 filed on Dec. 10, 2021, which is a Continuation-in-Part of U.S. patent application Ser. No. 17/305,528 filed on Jul. 9, 2021, the entire contents of which are incorporated herein by reference.

TECHNICAL FIELD

The following relates generally to managing loyalty program accounts.

BACKGROUND

Mobile applications (also referred to as "apps") are continuing to increase in popularity with customers and clients and are therefore increasingly adopted by businesses, agencies, and other organizations. With these increases in popularity and adoption, customers are found to expect such mobile apps to be able to do more and more for the user in order to get more out of their mobile experience.

Mobile apps may also embed or provide links to, or have associations with, loyalty programs. Loyalty programs are evolving from a one size fits all approach focused on aspirational travel rewards, to accessible everyday rewards offerings. Many new credit card offerings, for example, focus heavily on the everyday rewards space. Moreover, many retailers have their own loyalty program related to purchases online and in store.

Having to manage several loyalty accounts to determine when points can be redeemed, what can be redeemed, and if any special promotions apply can be difficult. Users may miss out on certain promotions or let points expire if they forget to check balances or engage with the loyalty account and associated app, leading to some of the aforementioned frustrations and difficulties.

Currently today there are sometimes hundreds of loyalty programs that customers interact with outside of a bank or payment card provider (that may have a loyalty program attached to the card). At times, many customers tend to forget that they already belong to these other loyalty programs when making a purchase. This is because often the loyalty points are only awarded when the customer remembers that they have a loyalty account and present a card (physical or digital) to the merchant at checkout or have it saved in an online profile. Therefore, the customer may be missing out on potential loyalty rewards.

BRIEF DESCRIPTION OF THE DRAWINGS

Embodiments will now be described with reference to the appended drawings wherein:

FIG. 4 is an example of a rule set for triggering loyalty alerts.

DETAILED DESCRIPTION

Figure 1:
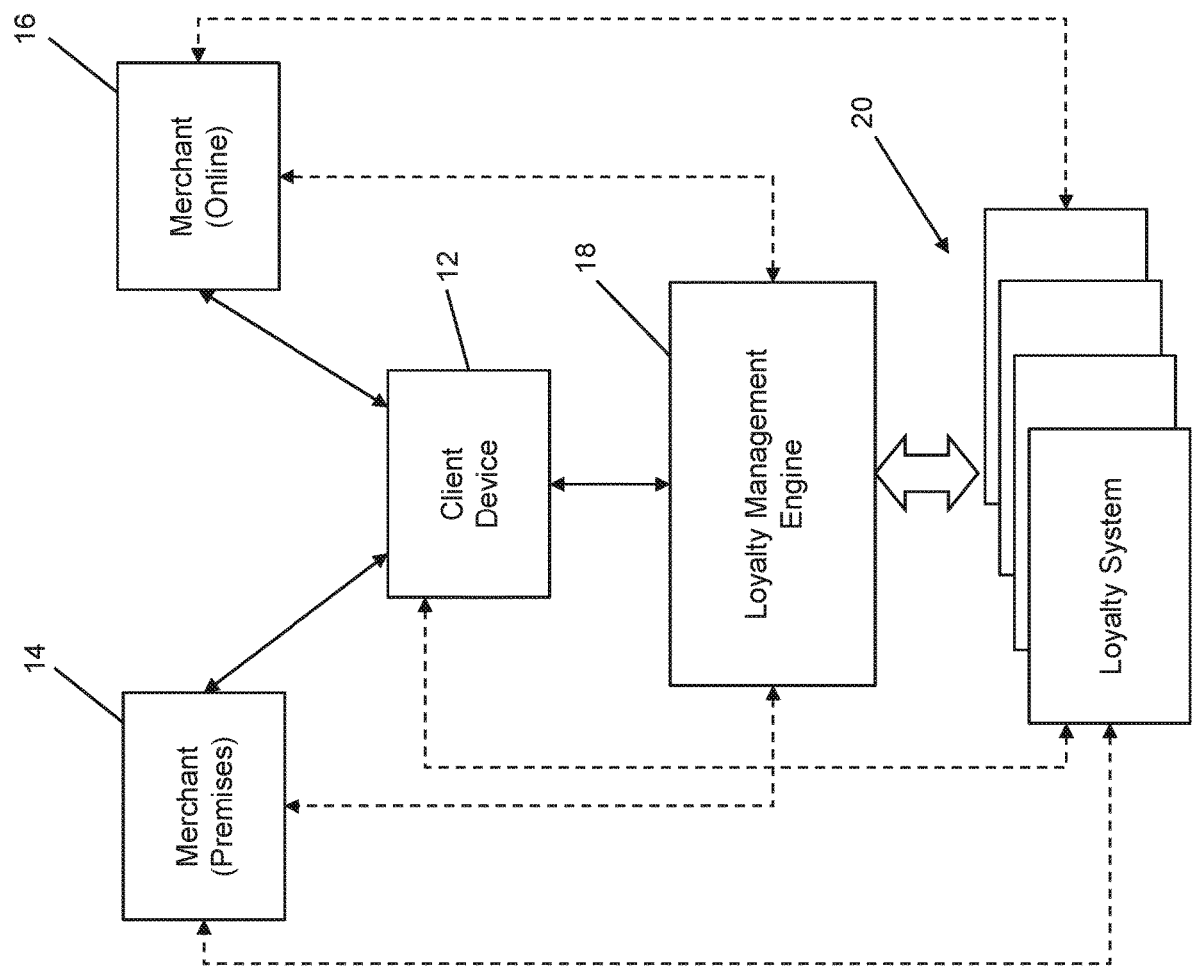
FIG. 1 is a schematic diagram of an example computing environment in which a loyalty management engine integrates workflows between a client device, merchants, and loyalty systems.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Customers use both physical and electronic versions of payment cards which may or may not be linked to loyalty programs. Many loyalty programs also have an app with an electronic card, or a physical card used to provide proof of membership in a loyalty program. While mobile/electronic wallets exist where these can be stored, there is no existing mechanism to track let alone remind a user of available and relevant loyalty programs for which they are eligible to use at the time of purchase.

A system, service and/or app feature or add-in is provided that creates an ability to notify a customer when making a purchase on a non-bank (or payment card) loyalty program before the purchase is finalized to confirm if they want to use a loyalty card or, in some circumstances make the purchase through another channel where they can maximize loyalty rewards, e.g., with Rakuten® or eStore®. The system or service can provide the customer with the ability to create or add to a list of non-payment card loyalty programs to which they belong. In this way, a mobile loyalty wallet can be provided that allows customers to track which programs they belong and have the system automatically determine, using certain triggers or events, that a loyalty program could be used, and notify the customer.

It will be appreciated that while examples provided herein are directed to customer/client interactions in mobile applications and with loyalty systems associated with or provided by a financial institution environment, the principles discussed herein equally apply to other types of enterprises providing an environment in which loyalty programs or loyalty campaigns can be tied, including both permanent and temporary loyalty campaigns or accounts.

Certain example systems and methods described herein are able to manage loyalty accounts and integrate such management with client devices, enterprise systems, and/or loyalty hub platforms. In one aspect, there is provided a device for managing loyalty program accounts. The server device includes a processor, a communications module coupled to the processor, and a memory coupled to the processor. The memory stores computer executable instructions that when executed by the processor cause the processor to provide, from the device, access to a loyalty wallet application. The memory also stores computer executable instructions that when executed by the processor cause the processor to store loyalty account information for a plurality of loyalty accounts in the loyalty wallet application, and integrate a loyalty tracking application, operable from the device, with at least one transaction channel accessed via the device. The memory also stores computer executable instructions that when executed by the processor cause the processor to receive transaction data from the at least one transaction channel; and detect, from the transaction data, that a transaction is eligible for a loyalty reward associated with one or more of the plurality of loyalty accounts. The memory also stores computer executable instructions that when executed by the processor cause the processor to modify the transaction to use corresponding loyalty account information to obtain the loyalty reward; and enable the modified transaction to be completed to obtain the loyalty reward.

In another aspect, there is provided a method of managing loyalty program accounts. The method is executed by a device and includes providing, from the device, access to a loyalty wallet application. The method also includes storing loyalty account information for a plurality of loyalty accounts in the loyalty wallet application; and integrating a loyalty tracking application, operable from the device, with at least one transaction channel accessed via the device. The method also includes receiving transaction data from the at least one transaction channel; and detecting, from the transaction data, that a transaction is eligible for a loyalty reward associated with one or more of the plurality of loyalty accounts. The method also includes modifying the transaction to use corresponding loyalty account information to obtain the loyalty reward; and enabling the modified transaction to be completed to obtain the loyalty reward.

In another aspect, there is provided a non-transitory computer readable medium for managing loyalty program accounts. The computer readable medium includes computer executable instructions for providing, from a device, access to a loyalty wallet application. The computer readable medium also includes computer executable instructions for storing loyalty account information for a plurality of loyalty accounts in the loyalty wallet application; and integrating a loyalty tracking application, operable from the device, with at least one transaction channel accessed via the device. The computer readable medium also includes computer executable instructions for receiving transaction data from the at least one transaction channel; and detecting, from the transaction data, that a transaction is eligible for a loyalty reward associated with one or more of the plurality of loyalty accounts. The computer readable medium also includes computer executable instructions for modifying the transaction to use corresponding loyalty account information to obtain the loyalty reward; and enabling the modified transaction to be completed to obtain the loyalty reward.

In certain example embodiments, the transaction can be modified by automatically adding the loyalty account information to the transaction prior to enabling the modified transaction.

In certain example embodiments, the transaction can be modified by redirecting the transaction to a different transaction channel to enable the loyalty account information to be used.

In certain example embodiments, the computer executable instructions further cause the processor to enable at least one loyalty alert to be executed based on at least one alert criterion. The at least one alert criterion can specify whether to monitor the transaction data based on i) a transaction type and/or ii) the transaction channel. The at least one alert criterion can also specify when to display a prompt to obtain confirmation of a proposed modification to the transaction. The prompt can be displayed in an e-commerce checkout window prior to completing the transaction. The prompt can include an option to cancel a current transaction and redirect the device to a different transaction channel.

In certain example embodiments, the device can be electronically coupled to a loyalty platform providing at least one function of the loyalty tracking application and/or at least one function of the loyalty wallet application. The loyalty platform can be integrated with an enterprise system to link a first loyalty program associated with the enterprise system with at least one second loyalty program each associated with a loyalty partner system. Modifying the transaction can include changing a payment account field to include a payment card associated with the first loyalty program of the enterprise system.

Referring now to the figures, FIG. 1 illustrates an example of a computer environment 8 in which a client device 12 participates in, is in proximity to, or otherwise has a linkage, association or other awareness of a merchant transaction, either at premises for a physical merchant 14 or an online merchant 16. It can be appreciated that the merchants 14, 16 can be associated with the same organization or entity and be providing both physical and electronic transaction channels. That is, a single merchant can provide one or more transaction channels in order to provide goods and/or services to customers associated with the client devices 12. Although a single client device 12 is shown in FIG. 1 it can be appreciated that typically many different client devices 12 are configured and able to participate in merchant transactions with such merchants 14, 16.

The client device 12 can be used in e-commerce environments (e.g., by accessing a website or using a downloaded app) to make a purchase with an online merchant 16, and/or can be used to participate in completing a transaction with a physical merchant 14, e.g., by providing an electronic payment card to a point of sale (POS) device (e.g., via near field communication (NFC), etc.), and/or by providing access to an electronic payment or loyalty card that can be scanned, e.g., using a barcode displayed within an app loaded on the client device 12. That is, the client device 12 illustrated in FIG. 1 can be used either directly or indirectly in completing a merchant transaction using any number of transaction channels. Moreover, the client device 12 depicted in FIG. 1 can represent both mobile and other types of electronic devices. In certain aspects, client device 12 can include, but is not limited to, a personal computer, a laptop computer, a tablet computer, a notebook computer, a handheld computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication and/or transaction channel including both long-range and short-range communication connections, networks, or media.

As discussed above, customers may use both physical and electronic versions of payment cards which may or may not be linked to loyalty programs. Many loyalty programs also have an app with a corresponding or embedded electronic card or barcode, or a physical card used to provide proof of membership in a loyalty program. While mobile/electronic wallets exist where these can be stored, there is no existing mechanism to track let alone remind a user of potential loyalty programs for which they are eligible at the time of purchase. To address these challenges and to provide a more seamless and user-friendly mobile experience, the client device 12 can include, or as shown in FIG. 1, otherwise be integrated with or in communication with, a loyalty management engine 18. The loyalty management engine 18 is interposed between certain functionalities of the client device 12 and one or more (and likely many) loyalty systems 20.

Each loyalty system 20 is associated with at least one loyalty program or campaign for which customers can have a loyalty account to earn loyalty points and redeem loyalty rewards or directly earn loyalty rewards. Such customers may utilize one or more client devices 12 in participating in such loyalty programs by registering and interacting with certain loyalty systems 20. As noted above, currently many customers tend to participate in many loyalty programs, to the extent that such customers could have a loyalty account with a substantial number of retailers that they shop with regularly. The loyalty management engine 18 is integrated into the computing environment 8 to offload at least some tracking and management responsibilities from the user of the client device 12 to ensure that loyalty programs and payment cards (often with loyalty points associated therewith) are optimally used depending on the type of transaction, type of merchant, type of transaction channel, and other third party events such as sales, promotions, geographical location, etc. Moreover, the loyalty management engine 18 is uniquely integrated into both the loyalty workflow and the transaction workflow (on potentially multiple transaction channels) to automate the detection of relevant loyalty programs, the coordination with online and physical transactions in real-time, the delivery and display of loyalty alerts, and can be used to automatically interrupt and/or modify transactions to achieve a loyalty-related objective such as to avoid missing opportunities to collect loyalty points/rewards or to maximize a loyalty outcome including redirecting proposed transactions to other channels.

Figure 2:
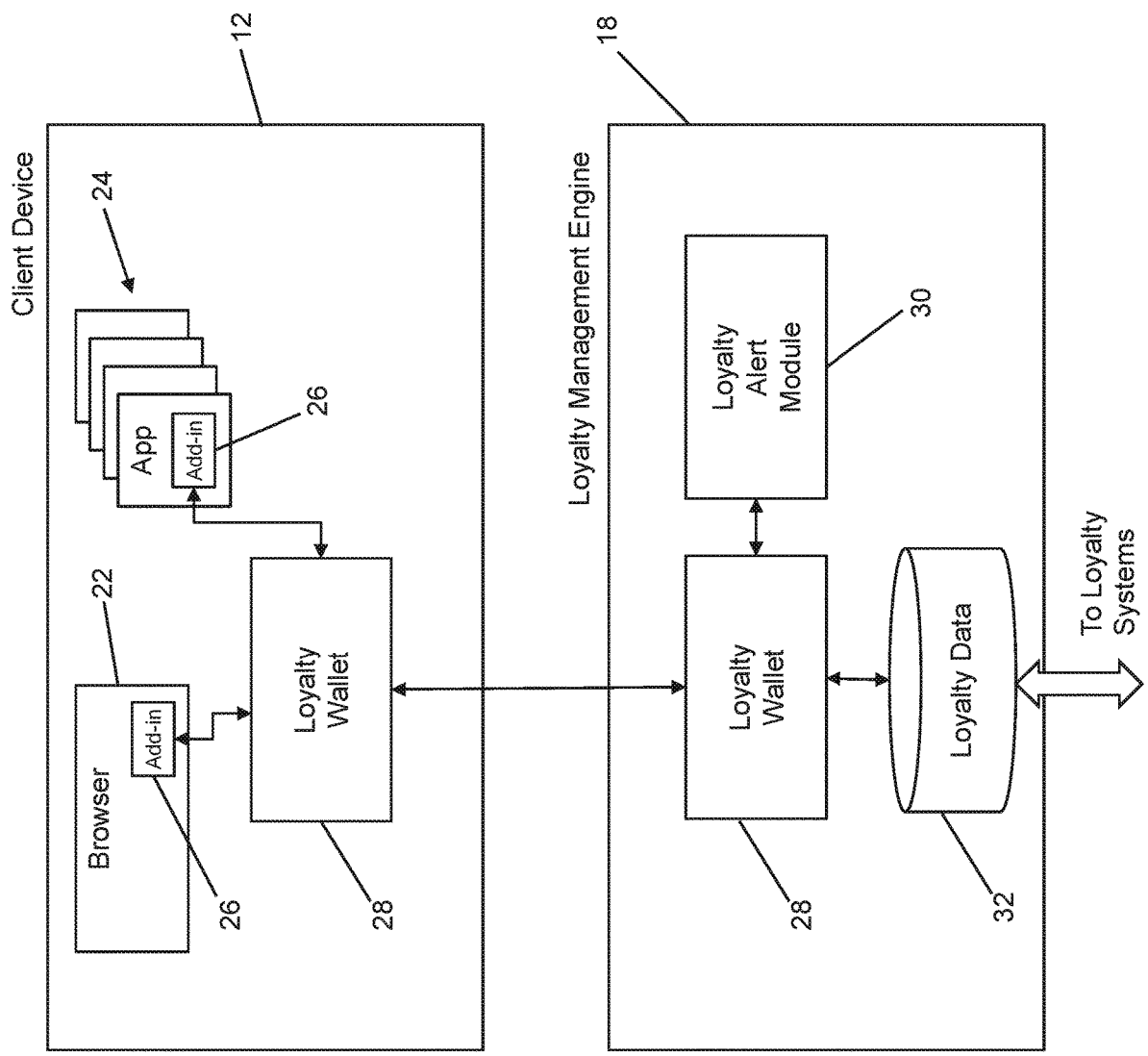
FIG. 2 is a schematic diagram illustrating further detail of the integration between the loyalty management engine and the client device.

FIG. 2 illustrates an example of a configuration that can be used with the client device 12 and the loyalty management engine 18 to enable the tracking, coordination and other automated operations discussed above. In this example, the client device 12 includes both a web browser application ("browser") 22 and one or more applications ("app(s)") 24. It can be appreciated that depending on the type of client device 12 either a browser 2 or app(s) 24 may be utilized and the client device 12 need not necessarily have access to both. The browser 22 and app(s) 24 may include a loyalty tracking application, plug-in, script, or other module of computer code, hereinafter referred to generally as an "add-in" 26 for brevity. The add-in 26 can be an extension of such a loyalty tracking application or can itself comprise the loyalty tracking application and it will be appreciated that the configuration shown in FIG. 2 is for illustrative purposes. The add-in 26 provides a mechanism to track, interrupt, redirect, augment, remove, or perform any other action associated with a merchant transaction being executed via the browser 22 or app(s) 24. For example, the add-in 26 can be deployed (and be authorized by the user) to detect when a transaction is being executed, is about to be executed or, in some cases, has just been executed, in order to modify the transaction to achieve a loyalty-based outcome such as the pre-emptive, real-time or corrective post-allocation of loyalty points or loyalty rewards directly. The add-in 26 can be configured to obtain predetermined information regarding a transaction such as the merchant, the transaction channel being used, along with other identifying information such as date and time stamps. This transaction data can be fed to the loyalty management engine 18 to compare with information about the loyalty systems 20 to determine if a loyalty-related outcome is being missed or not being optimized.

To perform tracking and to interrupt, redirect, and/or modify a transaction in any of these scenarios, the add-in 26 has access to, is otherwise fed data stored and managed by a loyalty wallet application ("loyalty wallet") 28, and/or communicates transaction data to the loyalty wallet 28 and/or loyalty management engine 18. The loyalty wallet 28 can be a separate wallet or a portion of another digital wallet, e.g., one that is provided by a mobile device provider to provide a wider "mobile wallet", including digital payment wallets and the like. The loyalty wallet 28 is therefore depicted as such in FIG. 2 to illustrate a capability to store and manage loyalty-related data, hereinafter referred to as "loyalty data" 32.

Figure 3A:
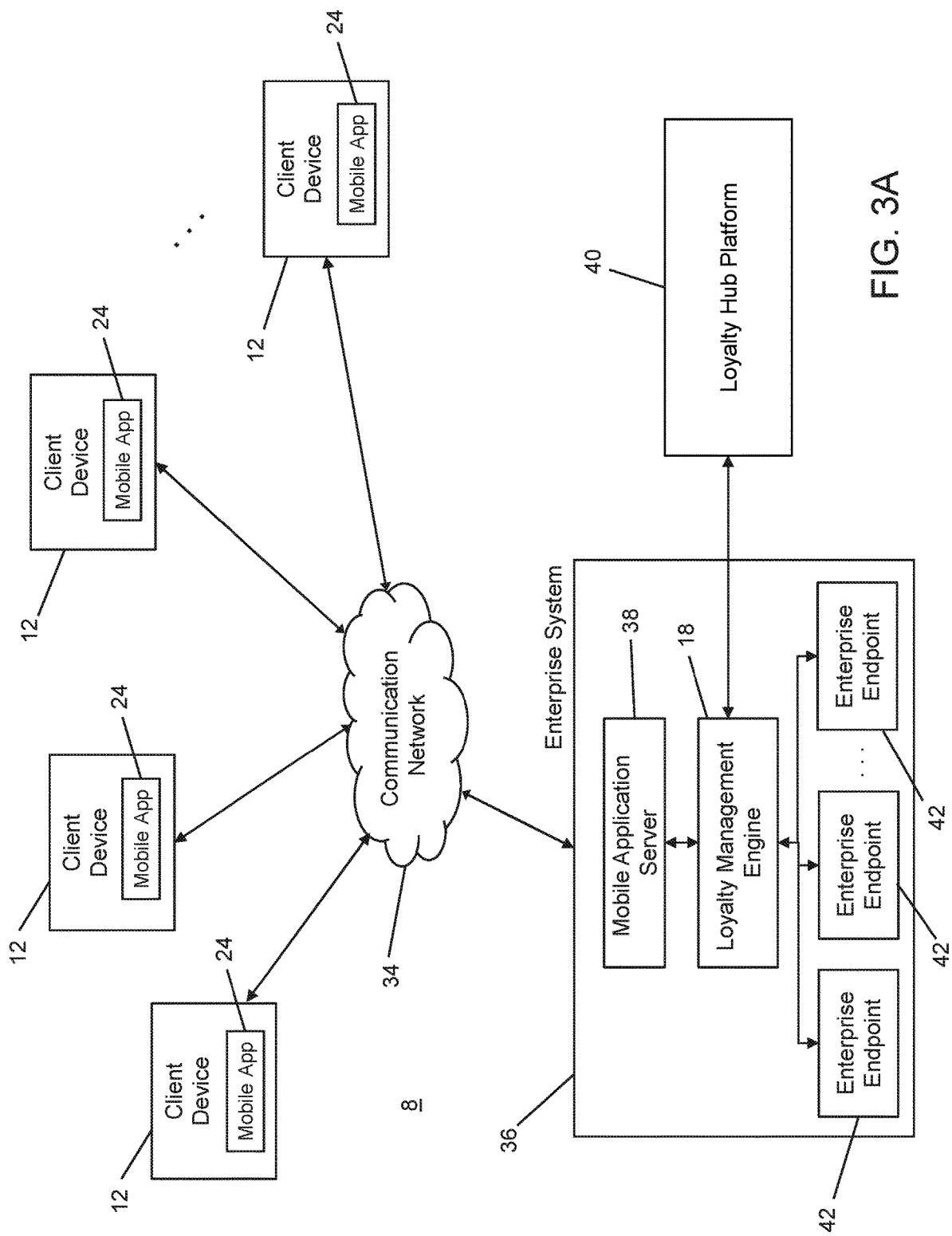
FIG. 3A is a schematic diagram illustrating an integration of the loyalty management system into an enterprise system environment having access to a loyalty hub platform.
Figure 3B:
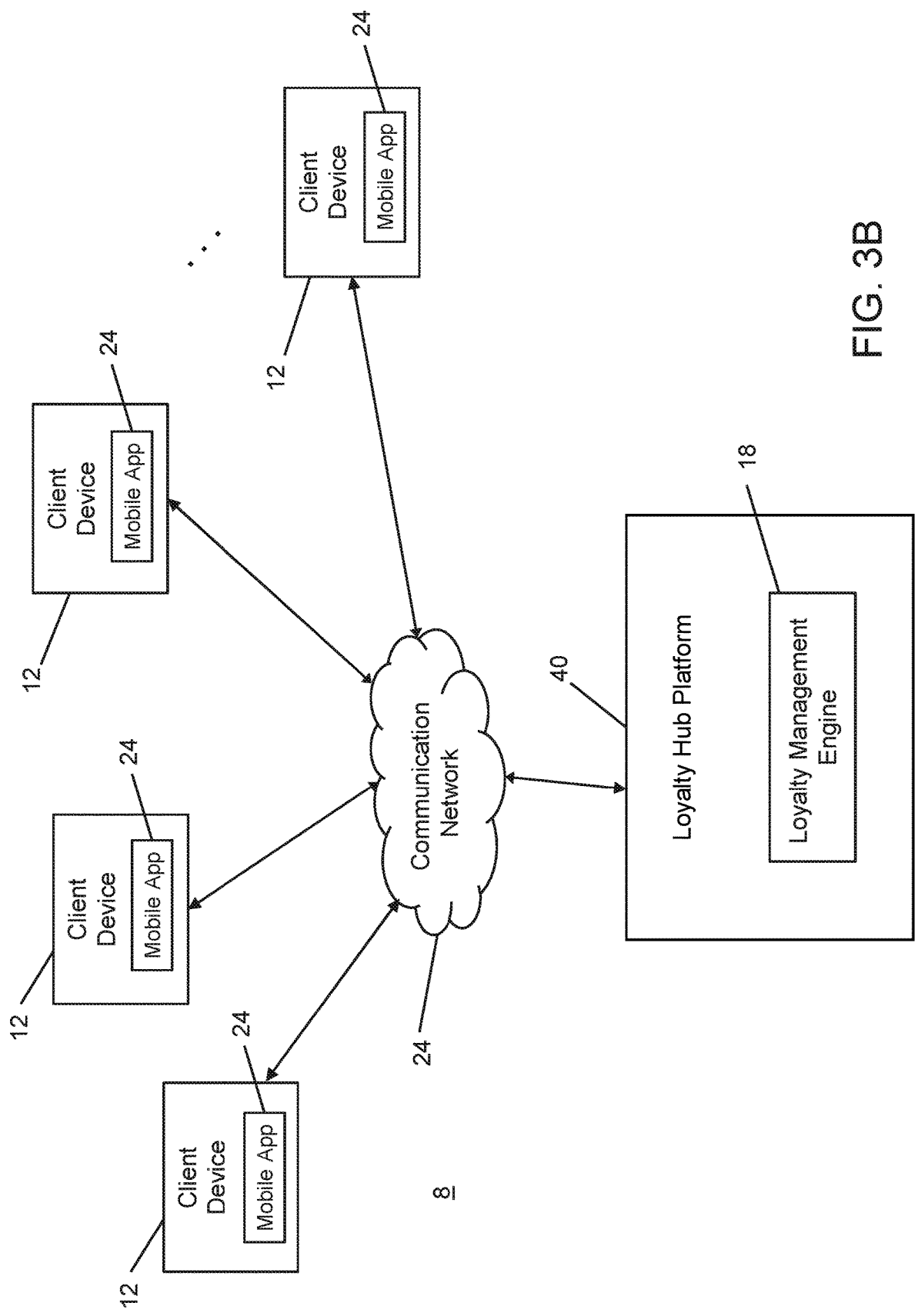
FIG. 3B is a schematic diagram illustrating an integration of the loyalty management system directly into a loyalty hub platform.

The loyalty wallet 28 in this example includes a client version running on the client device 12, which can include an API or other connection into a server-based loyalty wallet 28 running on the loyalty management engine 18. The loyalty wallet 28 can be deployed in any manner suitable to the configuration of the wider loyalty based system, or as dictated by an enterprise or service associated with the client device 12 as illustrated in FIGS. 3A-3B and discussed below. The loyalty wallet 28 running on the client device 12 may therefore provide a node or endpoint for the loyalty management engine 18 to interact locally with the add-in 26 or could be completely mirrored on the client device 12. Alternatively, the loyalty wallet 28 could be controlled primarily on the client device 12 with a connection to an endpoint within the loyalty management engine 18. The loyalty wallet 28 in whichever configuration, is coupled to or has access to a loyalty alert module 30 which can be used to apply rule sets, policies, or other instructions to determine when and if to trigger an alert associated with actions performed by the add-in 26 or loyalty wallet 28. For example, the loyalty alert module 30 can be used to determine at which point in a transaction to trigger an alert regarding a potential modification to the transaction, which can depend on the type of transaction channel, type of client device 12 and type or location of merchant 14, 16.

The loyalty wallet 28 can also have access to certain loyalty data 32, which would typically be provided by the loyalty system(s) 20. As such, the loyalty data 32 shown in FIG. 2 can instead be accessed directly from the corresponding loyalty system 20 and need not be cached locally. However, advantageously, at least some loyalty data 32 can be cached to provide for more efficient handling of real-time tracking and control operations to be performed by the add-in 26 and/or loyalty wallet 28. For example, the loyalty data 32 can be updated to include status identifiers, current loyalty promotions, companion cards, family/companion linkages, etc. As noted above, the loyalty data 32 can be correlated to transaction data obtained by the add-in 26 to determine if/when a loyalty-related outcome is not being achieved or optimized.

The loyalty wallet 28 can include, or as shown in FIG. 2, have access to a loyalty alert module 30. The loyalty alert module 30 provides logic and rule set(s) and/or policies for determining when to interrupt or provide a notification or alert with respect to an ongoing to impending transaction. For example, the loyalty alert module 30 can be used to impose certain rules to avoid certain transactions from being interrupted and/or can provide user configurability to have exclusions or preferences set on a merchant, user, or transaction-type basis. For example, the customer can set (through their loyalty wallet 28 or directly within the loyalty alert module 30) whether to provide notifications in browser or in-app purchases versus notifications based on detecting that the client device 12 is in proximity to a physical merchant 14 for which the customer has an affiliated loyalty account.

That is, the loyalty alert module 30 can be executed in concert with the loyalty wallet 28 and add-in 26 to not only perform tracking and notifications, but also to perform customizations on a user basis to balance the competing objectives of providing useful loyalty-based alerts with potentially saturating the customer with excess reminders and notifications. The customer can also have the ability to set defaults as well as sub-profiles for different shoppers using the same client device 12. For example, a loyalty management engine 18 operating with a home computer client device 12 could detect or request confirmation of which user or user type is currently using the client device 12 to load an appropriate client profile and associated alert module settings. In this way, the loyalty management engine 18 can provide full customizability to customers as they integrate the loyalty wallet 28 with their browser 22 and/or app(s) 24 used for performing both online and in-person transactions. It may be noted that the loyalty alert module 30 can, as noted above, refer to location-based information to pre-emptively detect that the customer is within or near a physical merchant 14 to either alert the user before or during a transaction that they already have the associated loyalty account, or suggest using a different channel. For example, the customer may be shopping within a store that has an online presence with cashback or other incentives not available in-store. By providing a nudge or reminder of same, the customer can potentially modify the way they obtain the good or service, e.g., by browsing or trying on in person then later buying online using a cash-back portal such as Rakuten®.

It can be appreciated that the loyalty alert module 30, with the appropriate permissions and/or settings, can be operable to provide appropriate alerts, notifications, suggestions, or reminders at any point in the shopping experience, including interrupting a real-time POS transaction. In such a scenario, the loyalty alert module 30 can freeze the device payment mechanism until the notification is confirmed or dismissed. For example, a user purchasing a good at a physical merchant 14 could be prompted when trying to pay through their client device 12 that they have not utilized a loyalty account and/or could be using a different payment card to obtain certain loyalty points or rewards. In this way, the interruption can be used to enable a modification to the transaction to select a different payment card and/or to augment the transaction with the loyalty account. This can include an automated exchange with the POS terminal or by providing an opportunity for the customer to have the merchant cancel or modify the transaction to avoid missing a loyalty outcome opportunity.

FIG. 3A illustrates another exemplary computing environment 8 in which the loyalty management engine 18 can be deployed. In one aspect, the computing environment 8 shown in FIG. 3A may include an enterprise system 36 having a loyalty management engine 18, a loyalty hub platform 40, one or more client devices 12, and a communications network 34 connecting one or more components of the computing environment 8. The computing environment 8 can also include third party events or entities (e.g., from data and information available online and/or made available via third party systems)—not shown in FIG. 3A for ease of illustration.

The enterprise system 36 may be associated with a financial institution system (e.g., for a commercial bank) that provides financial services accounts to users and processes financial transactions associated with those financial service accounts. This can include providing customer service options via an app 24 that can be downloaded to and used by users of the client devices 12. The enterprise system 36 includes a mobile application server 38 used to host or serve the mobile app 24 and the loyalty management engine 18 provides an interactive layer between the mobile application server 38 and one or more enterprise endpoints 42 and the loyalty hub platform 40. Each enterprise endpoint 42 can be associated with a department, line of business, service or other entity or sub-entity within or associated with the enterprise system 36. For example, in a financial institution system, one enterprise endpoint 42 can be associated with everyday banking while another endpoint 42 can be associated with credit accounts or investment accounts, mortgages, insurance, etc. While several details of the enterprise system 36 have been omitted for clarity of illustration, reference will be made to FIG. 10 below for additional details.

The loyalty hub platform 40 can be a separate entity as shown in FIG. 3A or a component of the enterprise system 36. As discussed herein, the loyalty hub platform 40 can be leveraged by the enterprise system 36 to integrate personalized loyalty-based notifications, offers, tips, and other information, by also leveraging access to the data and information available internally via the enterprise endpoints 42 and client data 168 (see also FIG. 10).

Client devices 12 may be associated with one or more users. Users may be referred to herein as customers, clients, correspondents, agents, or other entities that interact with the enterprise system 36 and/or loyalty management engine 18 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments.

For example, the user may use client device 12 to engage and interface with a mobile or web-based banking application (i.e., the mobile app 24) which permits the loyalty management engine 18 to determine and provide loyalty alert-related notifications to the mobile app 24 of a particular or particular ones of the client devices 12.

Communication network 34 may include a telephone network, cellular, and/or data communication network to connect different types of client devices 12. For example, the communication network 34 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, loyalty management engine 18 may be one or more computer systems configured to process and store information and execute software instructions to perform one or more processes consistent with the disclosed embodiments. In certain embodiments, although not required, loyalty management engine 18 may be associated with one or more business entities. In certain embodiments, the loyalty management engine 18 may represent or be part of any type of business entity. For example, loyalty management engine 18 may be a system associated with a commercial bank (e.g., enterprise system 36), a retailer, utility, government entity, educational institution, or some other type of business. The loyalty management engine 18 can also operate as a standalone entity (see, e.g., FIG. 3B) that is configured to serve multiple business entities, e.g., to act as an agent therefor.

Continuing with FIG. 3A, the loyalty management engine 18 and/or enterprise system 36 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the loyalty management engine 18 and enterprise system 36. The cryptographic server may be used to protect sensitive data (e.g., financial data) and/or client data 168 and/or mobile app data (not shown) and/or loyalty data 32 (see also FIG. 2) and/or data stored in a datastore associated with the loyalty alert module 30 used to store alert/notification rules (see also FIG. 4), by way of encryption for data protection, digital signatures or message digests for data integrity, and by using digital certificates to authenticate the identity of the users and client devices 12 with which the enterprise system 36 and/or loyalty management engine 18 communicates to inhibit data breaches by adversaries. It can be appreciated that various cryptographic mechanisms and protocols can be chosen and implemented to suit the constraints and requirements of the particular deployment of the loyalty management engine 18 or enterprise system 36 as is known in the art.

Referring now to FIG. 3B, another exemplary configuration is shown in which the loyalty hub platform 40 directly integrates the loyalty management engine 18 outside of a particular enterprise system 36. The configuration shown in FIG. 3B can be deployed when the loyalty hub platform 40 is provided as a separate standalone service from any particular enterprise. However, this configuration can also be deployed in scenarios wherein the loyalty hub platform 40 is itself integrated within an enterprise system 36. That is, FIG. 3B illustrates that the loyalty management engine 18 and loyalty hub platform 40 can be deployed and be communicative with the client devices 12 and associated apps 24/browser 22 in any suitable configuration that enables the principles discussed herein to be executed.

Referring again to FIG. 3A, the loyalty management engine 18 is shown as coupled to various components, entities, and services of, or associated with, the enterprise system 36 and mobile app 24 whether the loyalty management engine 18 is integrated into the enterprise system 36 or provided separately as a service therefor. The loyalty management engine 18 is also coupled to or associated with the loyalty hub platform 40 and other external entities or services that provide or can be analyzed to obtain third party events, such as promotions provided by a loyalty partner associated with the loyalty hub platform 40.

The loyalty management engine 18 is positioned and operable between the mobile application server 38 and, in this example, a number of enterprise endpoints 42 to coordinate and deliver notifications to the app 24/browser 22 that are associated with loyalty partners or other loyalty programs associated with the enterprise system 36 and/or loyalty hub platform 40 and which leverages details of accounts, client data 168, products, services, or features of the app 24 (or browser 22) that are handled or provided by certain enterprise endpoints 42. For example, a notification can be generated by the loyalty management engine 18 (e.g., using the loyalty alert module 30) based on transactional account information pulled from one or more enterprise endpoints 42 that can be correlated to loyalty data 32 associated with the loyalty hub platform 40. In this way, the loyalty management engine 18 can also provide an intermediary to coordinate and integrate features of the app 24 and loyalty hub platform 40 through a common integrated interface. In this example, each enterprise endpoint 42 includes or has access to client data 168 associated with one or more accounts for users of client devices 12 running the app 24. However, it can be appreciated that multiple endpoints 42 can have access to the same client data 168 in other configurations.

The mobile application server 38 includes or otherwise has access to a datastore for storing mobile app data, which can include data also stored as client data 168 by an enterprise endpoint 42 and/or provide a cache for same. The data 168, 32 may include any information or content, such as account data, personal data, conversation scripts or other contextual data (e.g., from call center interactions), metadata, tags, notes, files (e.g., PDFs), links (e.g., uniform resource locators (URLs)), images, videos, etc. that are created from or otherwise relate to interactions (e.g., conversations) between entities in the computing environment 8, in particular those made using client devices 12 via one or more communication channels available via the communication network 34 or other communication networks 34. As such, the data 168, 32 can be used by the loyalty management engine 18 in performing operations such as those described herein. The client data 168 may include both data associated with a user of a client device 12 that interacts with the enterprise system 36 and app 24/browser 22 (e.g., for participating in mobile banking and using customer service channels associated with such banking) and transaction history data that is captured and provided with a transaction entry, e.g., in the graphical user interface of a mobile or web-based banking application. The data associated with a user can include client profile data that may be mapped to corresponding financial data for that user and/or may include some of the financial data. Client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the enterprise system 36, e.g., login history, search history, communication logs, metadata, files, documents, etc.

It can be appreciated that the datastores used to store client data 168, loyalty data 32, and mobile app data are shown as separate components from the enterprise endpoints 42, mobile application server 38/enterprise system 36, and loyalty hub platform 40 for illustrative purposes only and may also be at least partially stored within a database, memory, or portion thereof within the enterprise system 36.

While not shown in the figures, the loyalty management engine 18 can include or have access to a machine learning system, which can be employed to train one or more models based on established logic and/or historical data concerning past delivery of alerts and notifications, what is used to trigger such notifications, and at which day/time, location, cadence, etc. they are displayed. The machine learning system can employ various machine learning techniques and can be used over time to continuously train and retrain models based on new notifications and client data 168.

By integrating or coupling the loyalty management engine 18 to multiple enterprise endpoints 42 in the enterprise system 36 and to the loyalty hub platform 40, the loyalty management engine 18 can take into account different sets of client data 168 and indicators or flags detectable from that data 168 to provide coordinated personalized notifications to the app 24/browser 22 without overwhelming the user of the client device 12. In this way, a single personalization "hub" can be provided in an extensible and scalable manner to adapt to changing configurations and to accommodate new entities and services provided within the enterprise system 36 while maintaining consistency and familiarity of the personalized notifications for the user.

FIG. 4 illustrates an example of a rule set 44 for the loyalty alerts. In this example, the rule set 44 includes a loyalty alert 46 for each rule 52, with a series of characteristics of each alert 46 in a series of corresponding columns. Each alert 46 in this example has a corresponding trigger 48, i.e., at least one criterion that dictates when the alert 46 is to be displayed. For example, the loyalty alert 46 can specify an empty field in a transaction window, a reward differential (i.e. that a better reward could be obtained elsewhere or elsewise), an alternative payment card, etc. Each loyalty alert 46 also includes a corresponding alert location 50 which can be used to further customize the delivery of notifications by specifying where in the app 24 or browser 22 the notification is to be displayed. For example, the notification can be displayed on or within a payment page, in any transaction page (e.g., the current one), within a shopping page, within a promotional email, text, or webpage, etc.

In FIG. 4, three examples are listed; and it can be appreciated that any number of rules 52 can be created, refined, removed, suppressed, or otherwise utilized on a per-service or per-client basis.

Referring now to FIGS. 5 through 8, example user interface (UIs) are shown that can be included in an app 24 or browser 22 to provide access to the loyalty wallet 28, adjust or add rules 52 to the alert module 30, and showing example notifications.

Figures 5, 6:
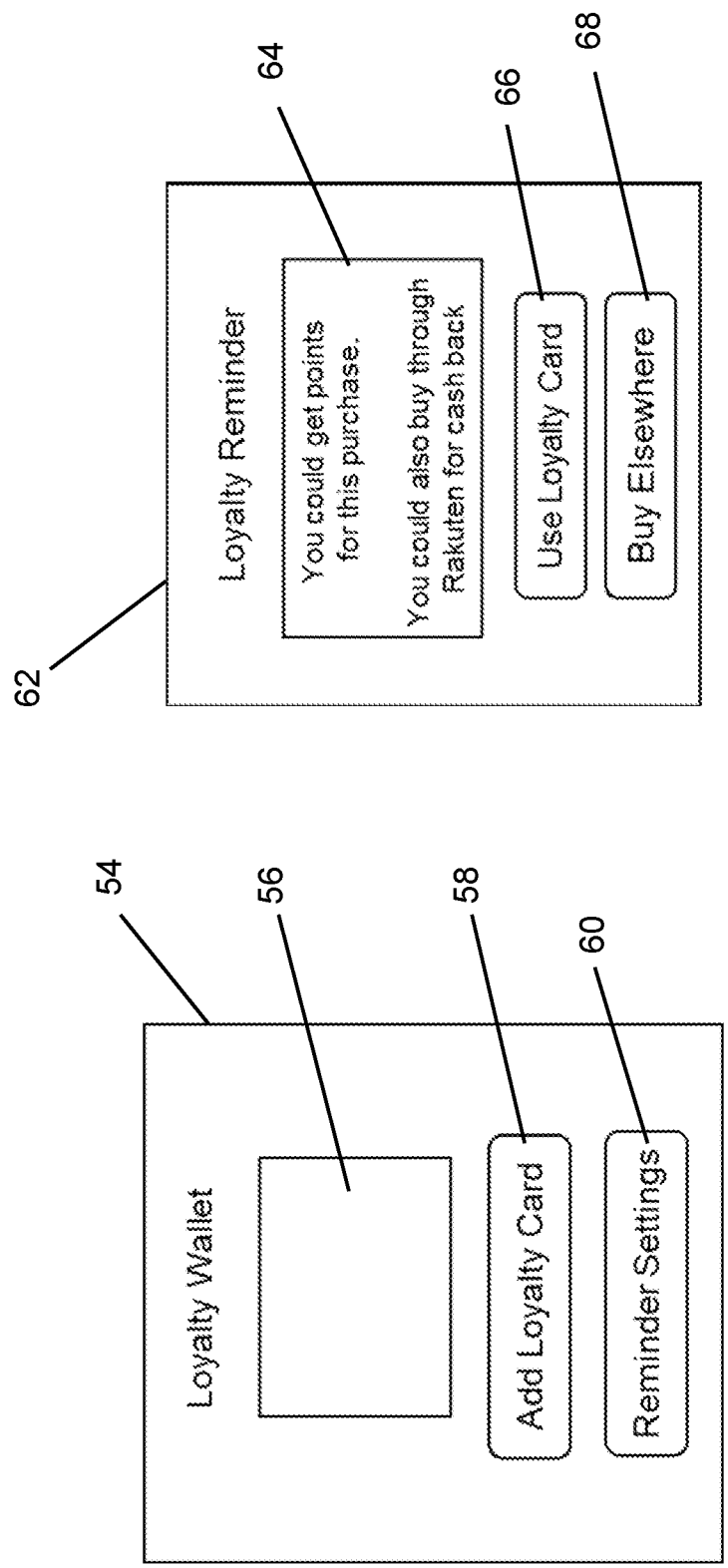
FIG. 5 is an example of a graphical user interface for a loyalty wallet application.
FIG. 6 is an example of a graphical user interface for a loyalty reminder.

FIG. 5 illustrates a loyalty wallet UI 54. In this example, the loyalty wallet 54 can include a loyalty program list 56 that can be used to show which loyalty programs the user has registered/added to the wallet application 28. The UI 54 also includes an Add Loyalty Card button 58 to enable a loyalty account to be added to the loyalty wallet application 28. A Reminder Settings button 60 is also provided, which provides access to a UI for adding or adjusting the rules 52 illustrated tabularly in FIG. 4. It can be appreciated that the UI for the loyalty alert module 30 can be depicted as shown in FIG. 4 with an ability to add or select from predefined options or can provide any other selectable set of options to enable a user to dictate preferred settings for receiving notifications described herein.

Figure 7:
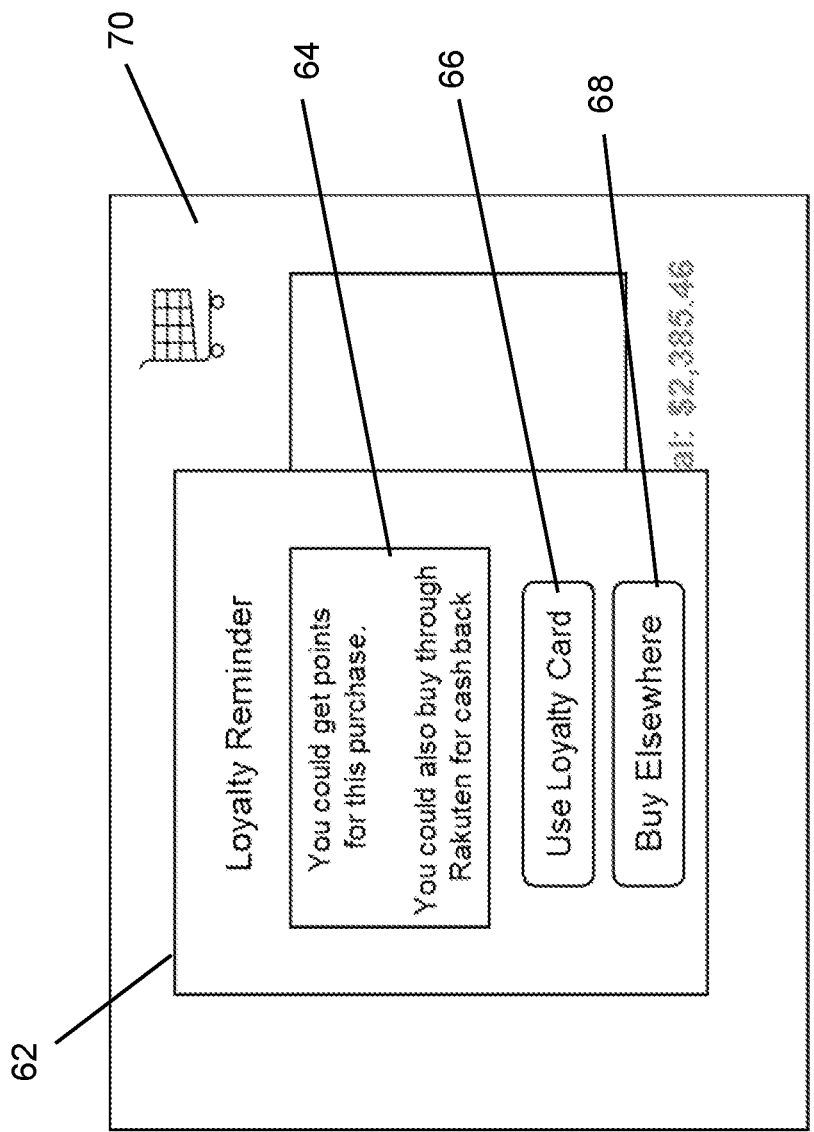
FIG. 7 is an example of a graphical user interface for a loyalty reminder displayed in an e-commerce checkout environment.

FIG. 6 illustrates an example of a loyalty reminder UI 62. The loyalty reminder UI 62 in this example includes a message box 64, which in this example says: "You could get points for this purchase. You could also buy through Rakuten for cash back". This example illustrates the provision of multiple coincident reminders, but it can be appreciated that individual reminders can also be provided or more than two reminders in the same reminder UI 62. The reminder UI 62 can also include a Use Loyalty Card button 66 to enable the user to confirm that they wish to associate their loyalty account with the transaction to be completed or in progress. A Buy Elsewhere button 68 can also be provided to enable the user to cancel or otherwise transfer the purchase to another channel. For example, the reminder UI 62 shown in FIG. 6 could be used at a POS terminal, within a shopping cart or checkout window in an app 24/browser 22 or at any suitable time. For instance, FIG. 7 illustrates the loyalty reminder UI 62 of FIG. 6 displayed over or within a shopping cart UI 70 to interrupt or otherwise augment or modify a transaction in real-time. The loyalty reminder UI 62 can be provided within the app 24/browser 22 or on a separate device (e.g., smart watch) at any point in the transaction. This can include, as noted above, post-transaction in scenarios where it is possible to retroactively assign a loyalty account to a purchase. That is, the loyalty management engine 18 can be operable to adaptably interject, interrupt, augment or redirect transactional workflows within or between transaction channels, either based on default behaviors and/or according to rules 52 set by the user.

Figure 8:
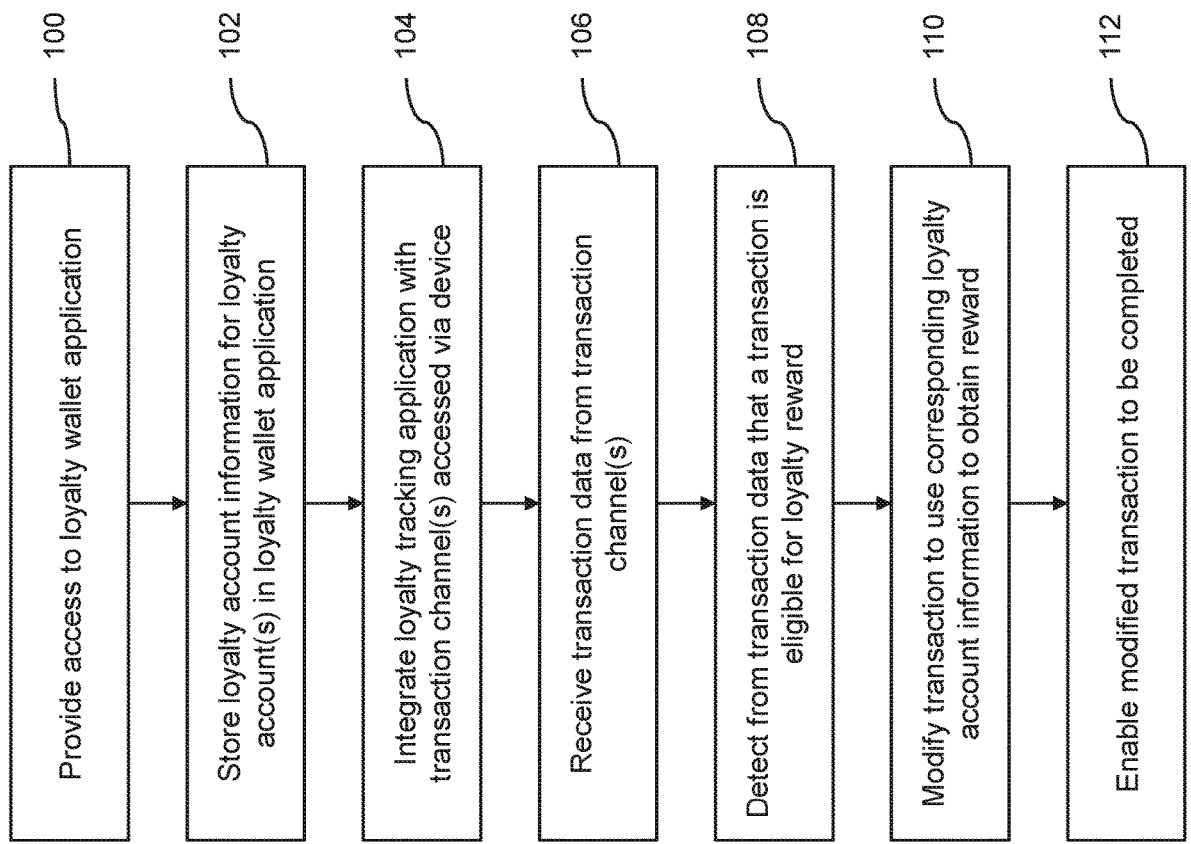
FIG. 8 is a flow diagram of an example of computer executable instructions for managing loyalty program accounts.

Referring now to FIG. 8, an example embodiment of computer executable instructions for managing loyalty program accounts is shown. At block 100, a computing device associated with or used by the loyalty management engine 18, loyalty wallet 28, and/or add-in 26, provides access to the loyalty wallet 28. At block 102, the device stores loyalty account information for loyalty account(s) in or via the loyalty wallet 28. At block 104, a loyalty tracking application such as the add-in 26 is integrated with at least one transaction channel accessed via the device, e.g., the browser 22 and/or app 24 as shown in FIG. 2. At block 106, the computing device receives transaction data from the transaction channel being used, e.g., data indicative of a purchase that is impending, is in progress, or has occurred. This can be gathered by the add-in 26 to detect appropriate times to trigger the loyalty management engine 18 and loyalty alert module 30. It can be appreciated that such operations can be performed within or by the loyalty wallet 28 or separately by the loyalty management engine 18 and/or the loyalty alert module 30. At block 108, the device detects from the transaction data that a transaction (e.g., yet to be executed or already executed) is eligible for a loyalty reward and is, for example, missing certain information to obtain the desired loyalty-related outcome. At block 110, the transaction is modified to use corresponding loyalty account information to obtain the reward. This can include, as noted above, augmenting the transaction to add loyalty account information, redirecting the user to a different channel or initiating a suitable process to rectify a missing reward on a prior transaction. At block 112, the device enables the modified transaction to be completed, such as by allowing the user to continue with or into a checkout page, transfer the user to another channel, initiate the post-transaction loyalty rectification process, etc.

Figure 9:
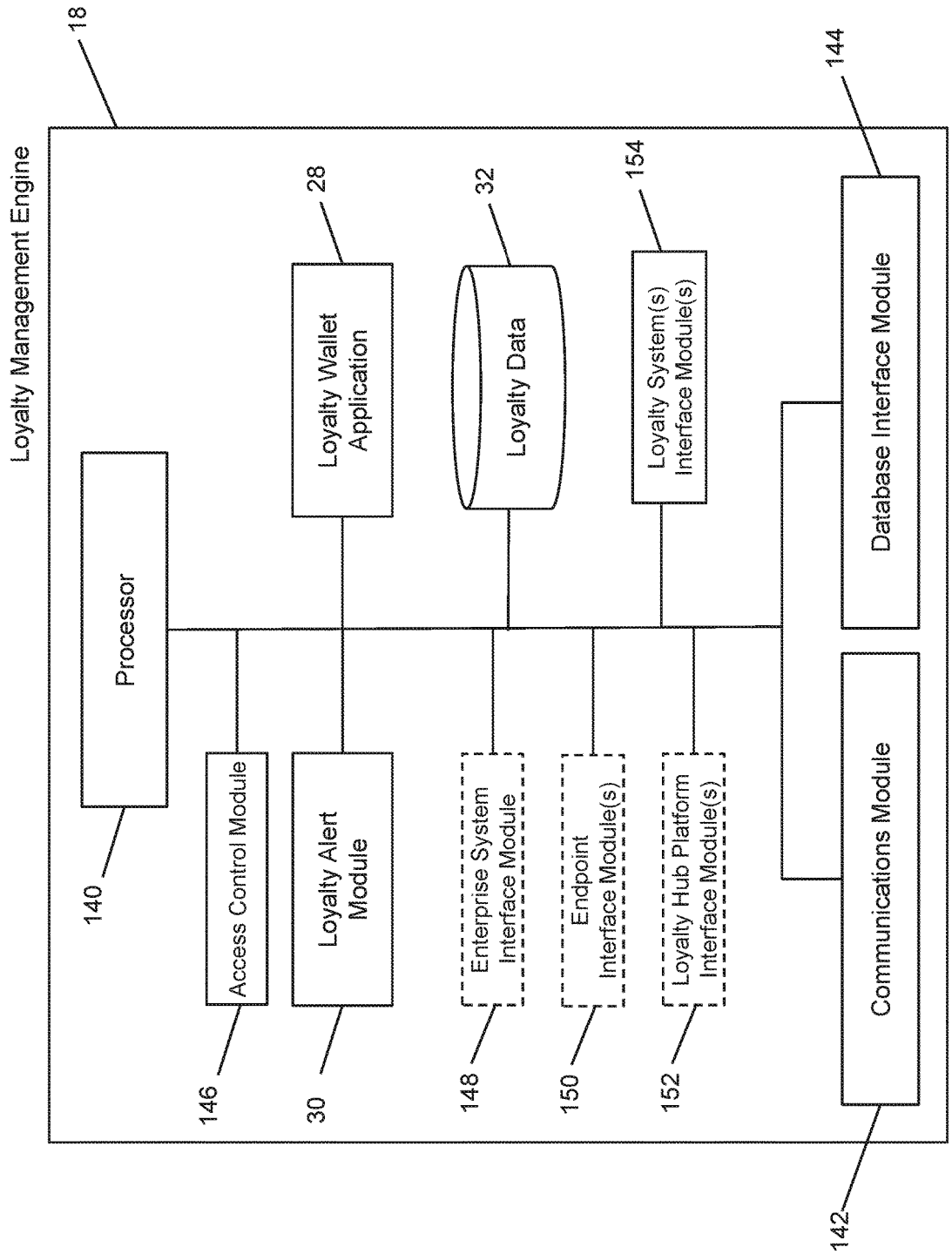
FIG. 9 is a block diagram of an example configuration of the loyalty management engine.

In FIG. 9, an example configuration of the loyalty management engine 18 is shown. In certain embodiments, the loyalty management engine 18 may include one or more processors 140, a communications module 142, and a database interface module 144 for interfacing with the data 168, 32, to retrieve, modify, and store (e.g., add) data. The loyalty management engine 18 can be embodied as one or more server devices and/or other computing device(s) configured to operate within computing environment 8. Communications module 142 enables the loyalty management engine 18 to communicate with one or more other components of the computing environment 8, such as client device 12 (or one of its components), via a bus or other communication network, such as the communication network 34. While not delineated in FIG. 9, the loyalty management engine 18 includes at least one memory or memory device that can include a tangible and non-transitory computer-readable medium having stored therein computer programs, sets of instructions, code, or data to be executed by processor 140. FIG. 9 illustrates examples of modules, tools and engines stored in memory on the loyalty management engine 18 and operated by the processor 140. It can be appreciated that any of the modules, tools, and engines shown in FIG. 9 may also be hosted externally and be available to the loyalty management engine 18, e.g., via the communications module 142. In the example embodiment shown in FIG. 9, the loyalty management engine 18 includes an access control module 146, the loyalty wallet application 28, the loyalty alert module 30, loyalty data 32, one or more loyalty system(s) interface module(s) 154 to interface with the one or more loyalty systems 20, (if applicable—e.g., according to FIG. 3A) an enterprise system interface module 148, (if applicable—e.g., according to FIG. 3A) one or more endpoint interface modules 150, and (if applicable—e.g., according to FIG. 3A or 3B) one or more loyalty hub platform interface modules 152.

The access control module 146 may be used to apply a hierarchy of permission levels or otherwise apply predetermined criteria to determine what client data 168 can be shared with which entity in the computing environment 8. For example, the loyalty management engine 18 may have been granted access to certain sensitive client data 168 or financial data for a user, which is associated with a certain client device 12 in the computing environment 8. Similarly, certain client profile data stored in the client data 168 may include potentially sensitive information such as age, date of birth, or nationality, which may not necessarily be needed by the loyalty management engine 18 to execute certain actions. As such, the access control module 146 can be used to control the sharing of certain client profile data or other client data 168 and/or content stored in the datastore for loyalty data 32 and/or other financial data based on a type of client/user, a permission or preference, or any other restriction imposed by the computing environment 8 or application in which the loyalty management engine 18 is used.

The various interface module(s) shown in FIG. 9 can take the form of an application programming interface (API), software development kit (SDK) or any other software, plug-in, agent, or tool that allows the loyalty management engine 18 to be integrated with or within an application associated with another entity.

Figure 10:
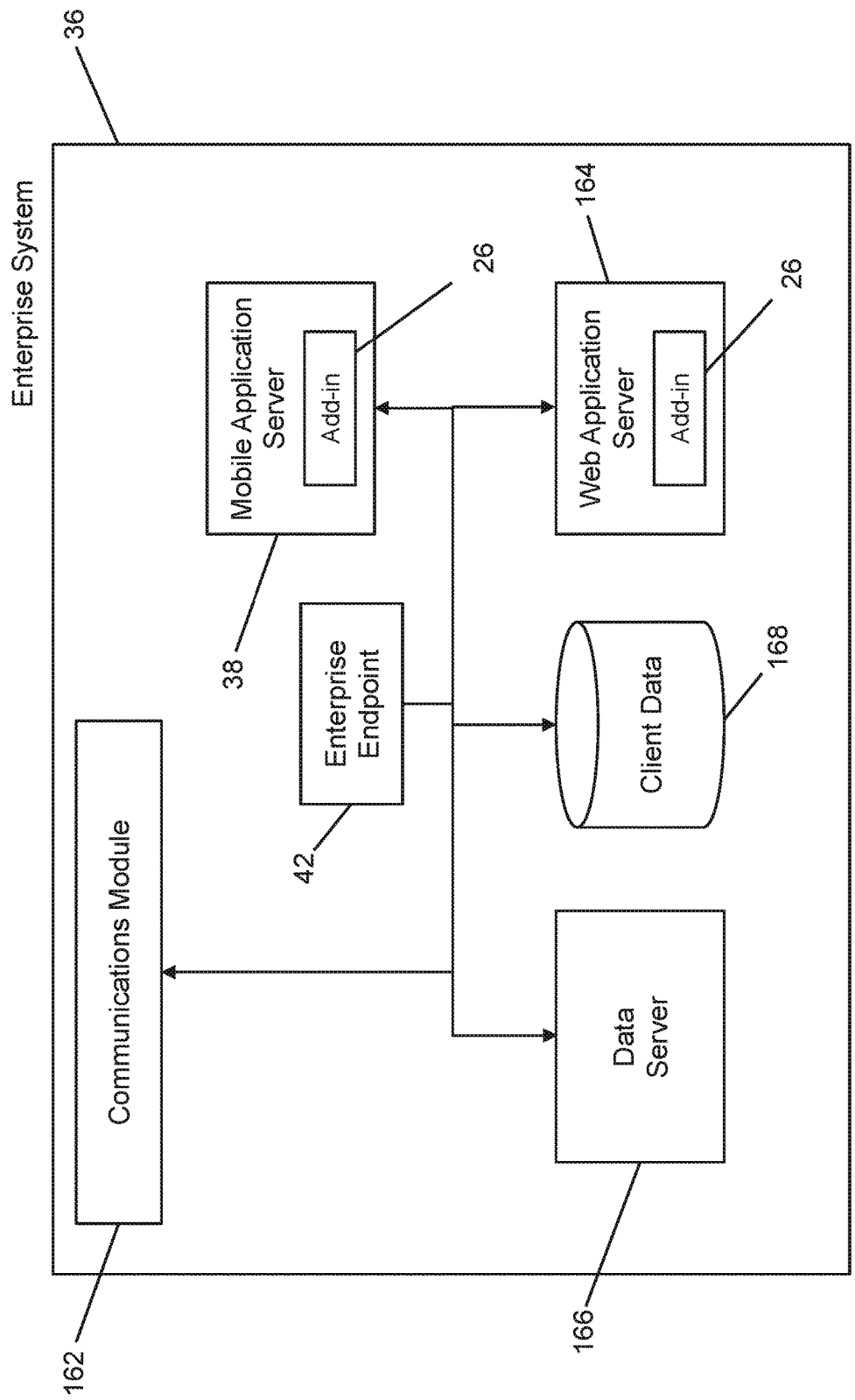
FIG. 10 is a block diagram of an example configuration of an enterprise system.

In FIG. 10, an example configuration for the enterprise system 36 is shown. The enterprise system 36 includes a communications module 162 that enables the enterprise system 36 to communicate with one or more other components of the computing environment 8, such as client device 12 (or one of its components) or loyalty management engine 18, via a bus or other communication network, such as the communication network 34. While not delineated in FIG. 10, the system 36 includes at least one memory or memory device that can include a tangible and non-transitory computer-readable medium having stored therein computer programs, sets of instructions, code, or data to be executed by one or more processors (not shown for clarity of illustration). FIG. 10 illustrates examples of servers and datastores/databases operable within the system 36. It can be appreciated that any of the components shown in FIG. 10 may also be hosted externally and be available to the system 36, e.g., via the communications module 162. In the example embodiment shown in FIG. 10, the enterprise system 36 includes one or more servers to provide access to the client data 168 to the loyalty management engine 18 via or on behalf of the enterprise endpoint(s) 24 to enable the loyalty management engine 18 to enable notifications to be created and for notifications to be learned, suggested and/or recommended to the user. Exemplary servers include the mobile application server 38, a web application server 164 and a data server 166. Although not shown in FIG. 10, as noted above, the system 36 may also include a cryptographic server for performing cryptographic operations and providing cryptographic services. The cryptographic server can also be configured to communicate and operate with a cryptographic infrastructure. The enterprise system 36 may also include one or more data storages for storing and providing data for use in such services, such as data storage for storing mobile app data and/or client data 168.

Mobile application server 38 supports interactions with the app 24 installed on client device 12. Mobile application server 38 can access other resources of the enterprise system 36 to carry out requests made by, and to provide content and data to, app 24 on client device 12. In certain example embodiments, mobile application server 38 supports a mobile banking application to provide payments from one or more accounts of user, among other things. As shown in FIG. 10, the mobile application server 38 can include the add-in 26.

Web application server 164 supports interactions using a website accessed by a web browser application 22 (see FIG. 2) running on the client device 12. It can be appreciated that the mobile application server 38 and the web application server 164 can provide different front ends for the same application, that is, the app (mobile) and web (browser) versions of the same application. For example, the enterprise system 36 may provide a banking application (with a loyalty page or loyalty functionality) that be accessed via a smartphone or tablet app while also being accessible via a browser on any browser-enabled device. As shown in FIG. 10, the web application server 164 may also include the add-in 26.

The client data 168 may include financial data, which can be associated with users of the client devices 12 (e.g., customers of the financial institution). The financial data may include any data related to or derived from financial values or metrics associated with customers of a financial institution associated with the enterprise system 36, for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices 12. As indicated above, it can be appreciated that the client data 168 may be part of the financial data held by the enterprise system 36 and is shown separately for ease of illustration and ease of reference herein. An enterprise endpoint 42 is shown in FIG. 10 for illustrative purposes. It can be appreciated that any one or more endpoints 42 may be located within the bounds of the enterprise system 36 as shown in FIG. 10 or may be located elsewhere and communicable therewith, as shown generally in FIG. 3A.

Figure 11:
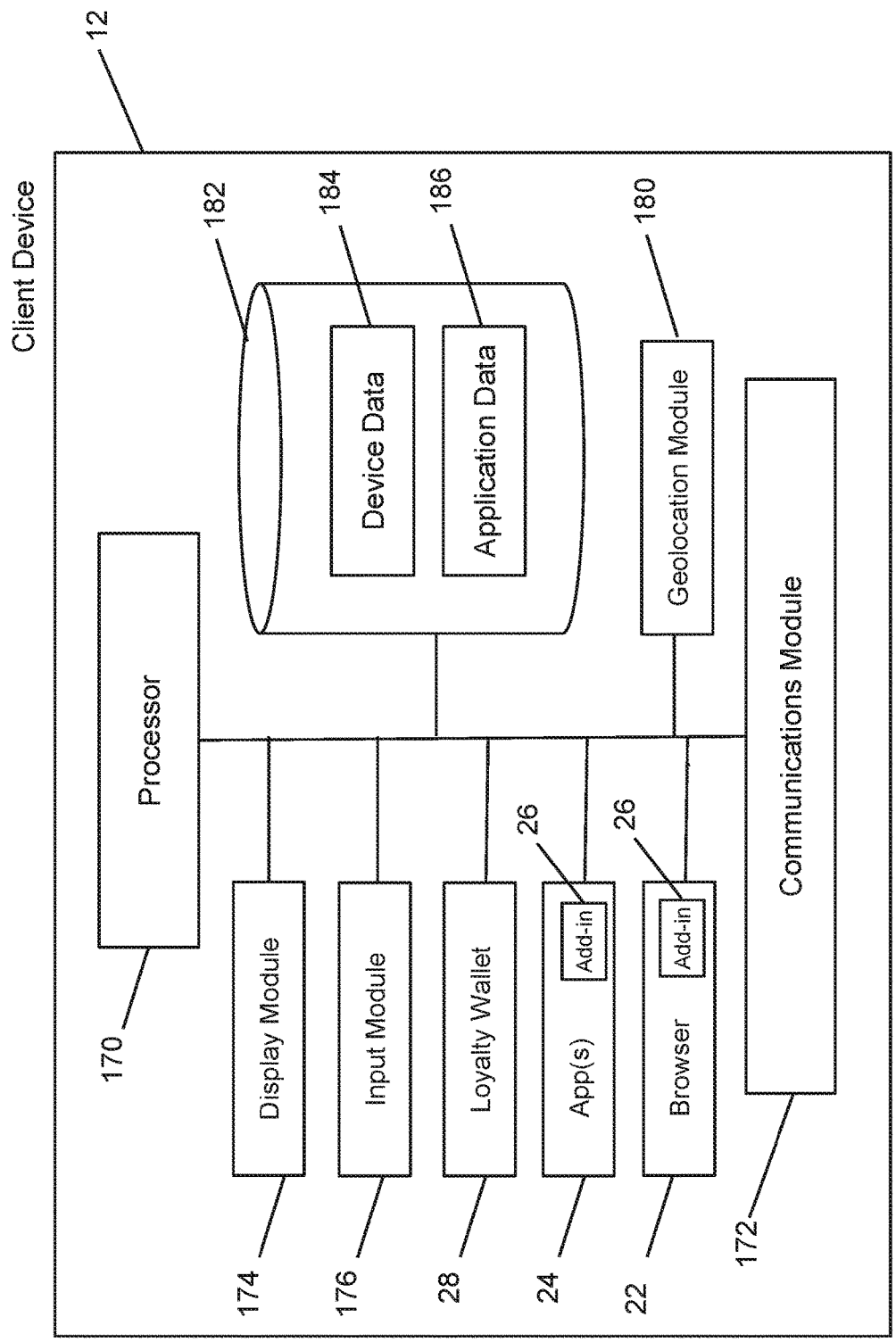
FIG. 11 is a block diagram of an example configuration of a client computing device associated with a user, customer, or client.

In FIG. 11, an example configuration for the client device 12 is shown. In certain embodiments, the client device 12 may include one or more processors 170, a communications module 172, and a data store 182 storing device data 184 and application data 186. Communications module 172 enables the client device 12 to communicate with one or more other components of the computing environment 8, such as loyalty management engine 18, loyalty hub platform 40, or enterprise system 36, via a bus or other communication network, such as the communication network 34. While not delineated in FIG. 11, the client device 12 includes at least one memory or memory device that can include a tangible and non-transitory computer-readable medium having stored therein computer programs, sets of instructions, code, or data to be executed by processor 170. FIG. 11 illustrates examples of modules and applications stored in memory on the client device 12 and operated by the processor 170. It can be appreciated that any of the modules and applications shown in FIG. 11 may also be hosted externally and be available to the client device 12, e.g., via the communications module 172.

In the example embodiment shown in FIG. 11, the client device 12 includes a display module 174 for rendering GUIs and other visual outputs on a display device such as a display screen, and an input module 176 for processing user or other inputs received at the client device 12, e.g., via a touchscreen, input button, transceiver, microphone, keyboard, etc. As noted above, the client device 12 can use such an input module 176 to gather inputs that are indicative of behavioral cues, facial recognition, presence detection, etc. The client device 12 may include one or more apps 24, e.g., an enterprise system app 24 provided by the enterprise system 36, e.g., for performing mobile banking operations and can be or be associated with the app 24 described herein. The client device 12 in this example embodiment also includes a web browser application 22 for accessing Internet-based content, e.g., via a mobile or traditional website, and the loyalty wallet 28 described above. The app(s) 24 and browser 22 can include the add-in 26 as depicted in FIG. 2. The data store 182 may be used to store device data 184, such as, but not limited to, an IP address or a MAC address that uniquely identifies client device 12 within environment 8. The data store 182 may also be used to store application data 186, such as, but not limited to, login credentials, user preferences, cryptographic data (e.g., cryptographic keys), etc. The client device 11 in this example also includes a geolocation module 180 such as a GPS receiver or other geolocation service to enable the client device 12 to report location information to the loyalty management engine 18, e.g., when tracking location relative to a physical merchant 14.

It will be appreciated that only certain modules, applications, tools and engines are shown in FIGS. 1 to 3B and 9 to 11 for ease of illustration and various other components would be provided and utilized by the management engine 18, enterprise system 36, loyalty hub platform 40, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in loyalty management engine 18, loyalty hub platform 40, or enterprise system 36, or client device 12, or accessible or connectable thereto. Any application or module herein described may be implemented using computer readable/executable instructions that may be stored or otherwise held by such computer readable media.

As illustrated above, the loyalty management engine 18 can be integrated into or otherwise be connected to and leverage the loyalty hub platform 40 to benefit further from the automation and integration provided by the loyalty management engine 18.

Figure 12:
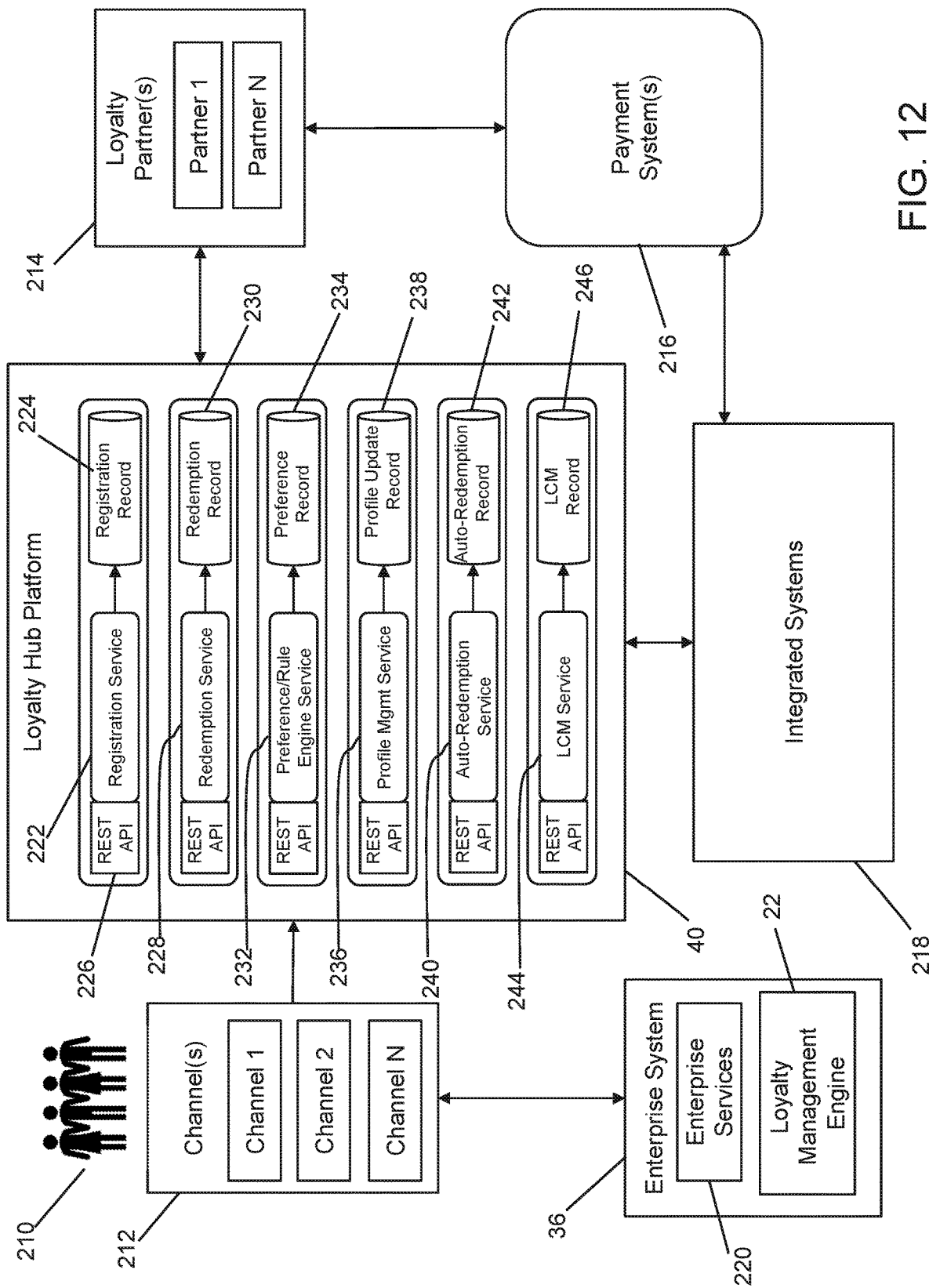
FIG. 12 is a schematic diagram of a loyalty hub platform integrated with an enterprise system and one or more loyalty partners.

FIG. 12 provides an example of a configuration for integrating the loyalty hub platform 40 with the enterprise system 36, one or more loyalty partner systems 214 (e.g., Partner 1, . . . . N for illustrative purposes); and one or more payment systems 216 used by the enterprise system 36 and loyalty partner system(s) 214 to enable customers 210 to process transactions. The customers 210 can also interact with the enterprise system 36 and the loyalty hub platform 40 via one or more communication channels 212, such as a mobile application, webpage or other via other channels 212 such as phone, text messaging, etc. Channels 1, 2, . . . . N are shown for illustrative purposes. The loyalty hub platform 40 can also provide an intermediary entity enabling customers 210 to access or be redirected to the loyalty partner systems 214 via one of the channels 212 the customer 210 uses to interact with the enterprise system 36. For example, the customer 210 may be redirected to a loyalty app via a mobile banking app when managing registration, redemption, conversion or other processes related to rewards such as everyday rewards. Also shown in FIG. 12 are integrated systems 218 which can be separate (as shown) or part of the enterprise system 36 and/or payment system 216 to enable the loyalty hub platform 40 to access book of record (BoR) data, determine the eligibility of certain debit or credit cards, obtain access to financial transactions (e.g., transaction data and/or additional financial-related data not available via the transaction data). The enterprise system 36 in FIG. 12 also includes enterprise services 220 that can be leveraged by the loyalty hub platform 40, e.g., messaging, notifications, data analytics, etc.; and the loyalty management engine 18 described in detail above.

The architecture for the loyalty hub platform 40 as shown in FIG. 12 includes a set of microservices to perform registration, redemption, apply rules, handle profiles, enable automatic redemptions, and handle lifecycle management. A microservice is a webservice which has a small and well-defined scope and is loosely coupled from any other webservice. The loyalty hub platform 40 includes a collection of microservices, each one self-contained and implementing a single and well defined business capability. Each service is a code base which can be managed by a small development team and does not need to share the same technology stack, library or frameworks, which allows each team to select the right tool for the job. This means, a single development team can build, deploy and test a service. These microservices provide a robust and scalable architecture for implementing the loyalty hub services on the platform 40.

The architecture shown in FIG. 12 assumes that customer linking with the loyalty partner system 214 is done at the customer level such that the loyalty partner membership is flagged to identify eligible customers and the loyalty partner system 214 can, based on this eligibility, give "accelerated" points on eligible purchases for all in-scope transaction cards offered by the enterprise system 36. Another assumption is that the loyalty hub databases store a customer's card level details. Also, the rewards accelerator can be enabled at the credit BoR by the loyalty hub platform 40 at the account level. The loyalty hub services include microservices that include or are coupled to a representational state transfer (REST) application programming interface (API) 226. Each microservice also includes its own distinct database or separate and distinct portion of a wider platform services database. In this example, a registration service 222 includes or has access to a registration record 224, a redemption service 228 includes or has access to a redemption record 230, a preference/rule engine service 232 includes a preference record 234, a profile management service 236 includes a profile update record 238, an auto-redemption service 240 includes an auto-redemption record 242, and a lifecycle management (LCM) service 244 includes an LCM record 246. It can be appreciated that the auto-redemption service 240 can be omitted or otherwise not utilized by a loyalty partner system 214 or particular linkage with the enterprise system 36 if an automatic redemption option is not utilized.

The registration service 222 fulfills a linked loyalty flow (see FIGS. 14a-14b described below) and is responsible for handling all orchestration required from the point that a customer 210 submits the linked loyalty flow on the enterprise system channel 212 onwards, including a call to the loyalty partner 214 (e.g., restaurant, coffee chain, etc.). Functions of the registration service 222 can include recording a history of all customer registration activity in the registration record 224, activating the acceleration rate for the enterprise system credit cards, notifying the loyalty partner system 214 of customer activity at the customer level, updating the profile management service 236 (see below) when a customer links cards to a loyalty partner and when a customer unlinks cards from loyalty partners, and providing a history of all customer linking/unlinking activity with a loyalty partner.

The redemption service 228 fulfills any transfer points to the loyalty partner (e.g., see flowchart in FIGS. 15a and 15b) and is responsible for handling all orchestration required from the point that a customer submits a one-time redemption through the enterprise system channel 212. The redemption service 228 can also process auto-redemption transactions. Functions of the redemption service 228 can include recording a history of all customer loyalty redemptions (transfer points to partner) in the redemption record 230, processing the enterprise system reward points redemption, notifying the loyalty partner of customer activity, and providing a history of all customer redemption activity with a loyalty partner.

The preference/rule engine service 232 maintains and validates loyalty hub business rules and is responsible for storing all of the business rules at a partner and card level for a loyalty program, e.g., in the preference record 234. The rule engine service 232 can also orchestrate the eligibility check of cards for linked loyalty and the transfer of points to partners (e.g., see FIGS. 14 and 15). Functions of the rule engine service 232 can also include providing an enterprise system card value proposition for each in-scope card with the loyalty partner (stored in the preference record 234), providing the loyalty partner and program information (also stored in the preference record 234), validating auto-redemption criteria stored in the preference record 234, validating one-time redemption criteria stored in preference record 234, running debit and credit card eligibility checks, and providing a list of loyalty hub frequently-asked questions (FAQs).

The profile management service 236 can be used to maintain a snapshot of the customer's linked enterprise system cards to loyalty partner(s) and can be made responsible for providing to the enterprise system channel(s) 212 the most up-to-date customer and loyalty partner linkage information. The profile management service 236 is also the gateway for customer eligibility for linked loyalty and transferring points to partners (see FIGS. 14-15). Functions of the profile management service 236 can include providing a list with cashback balances for each cashback product owned by the customer, providing a list with enterprise system rewards balances for each credit card product owned by the customer 210, providing a list of a customer's currently linked partners/products, providing a list of customer in-scope products for the loyalty partner, providing a list of customer eligible cards to transfer points to a partner or for auto-redemption, and providing rewards transactional histories.

The auto-redemption service 240 can be used to maintain and process customer auto-redemption details and is responsible for storing the most up-to-date customer auto-redemption instructions in the auto-redemption record 242, triggering the auto-redemption events, and orchestrating the required calls to perform same. Functions of the auto-redemption service 240 include time basing auto-redemption transactions, recording a history of all customer auto-redemption instructions, triggering auto-redemption events based on instructions, sending customer correspondence, updating the profile management service 236 (as noted above), processing enterprise system reward points redemptions, and notifying the loyalty partner of customer activity, e.g., which is delegated to the enterprise system's internal rewards/redemption service.

The LCM service 244 processes LCM events and is responsible for obtaining card event information for debit and credit card lifecycle updates and orchestrating calls to all impacted services. Functions of the LCM service 244 include processing credit card lifecycle events where a product transfer between eligible cards of the same reward takes place, processing credit card where a product transfer between eligible cards of different reward takes place, processing credit card lifecycle events where a credit card is closed, processing credit card lifecycle events where a debit card is closed, processing debit card lifecycle events where new card numbers are generated, processing credit card lifecycle events where new card numbers are generated, and processing customer new card openings.

The core microservices shown in FIG. 12 enable the loyalty partner systems 214 and the enterprise system 36 to link loyalty programs providing the flexibility to convert, transfer and/or accelerate points between programs. The individual microservices operate dynamically as described below based on event processing. This facilitates interface requests, integration actions through a common backend hub. The orchestration of the microservices by the loyalty hub platform 40 also ensures that the correct microservices are called as well as integrating inbound and outbound traffic with both the loyalty partner systems 214 and the payment systems 216 used to trigger the loyalty events. This arrangement avoids batch processing, which is more dynamic and allows one microservice to respond to an event (e.g., registration) even when another service is in a failure state (e.g., redemption or profile management, etc.). The independent services also enable customization on a partner-basis. For example, one loyalty partner system 214 may allow auto-redemption while others do not and the auto-redemption service 240 can be assigned to different loyalty partner systems 214 individually. Moreover, the microservice architecture allows additional microservices to be added, e.g., to add new features or offerings by the enterprise system 36 or loyalty partner(s) 214 on a permanent or temporary basis such as to handle promotional campaigns, etc. The incorporation of a preference/rule engine service 232 also enables individual rule sets to be applied and updated periodically on a partner-by-partner basis to avoid downtime when updating or upgrading linked loyalty campaigns.

Figure 13:
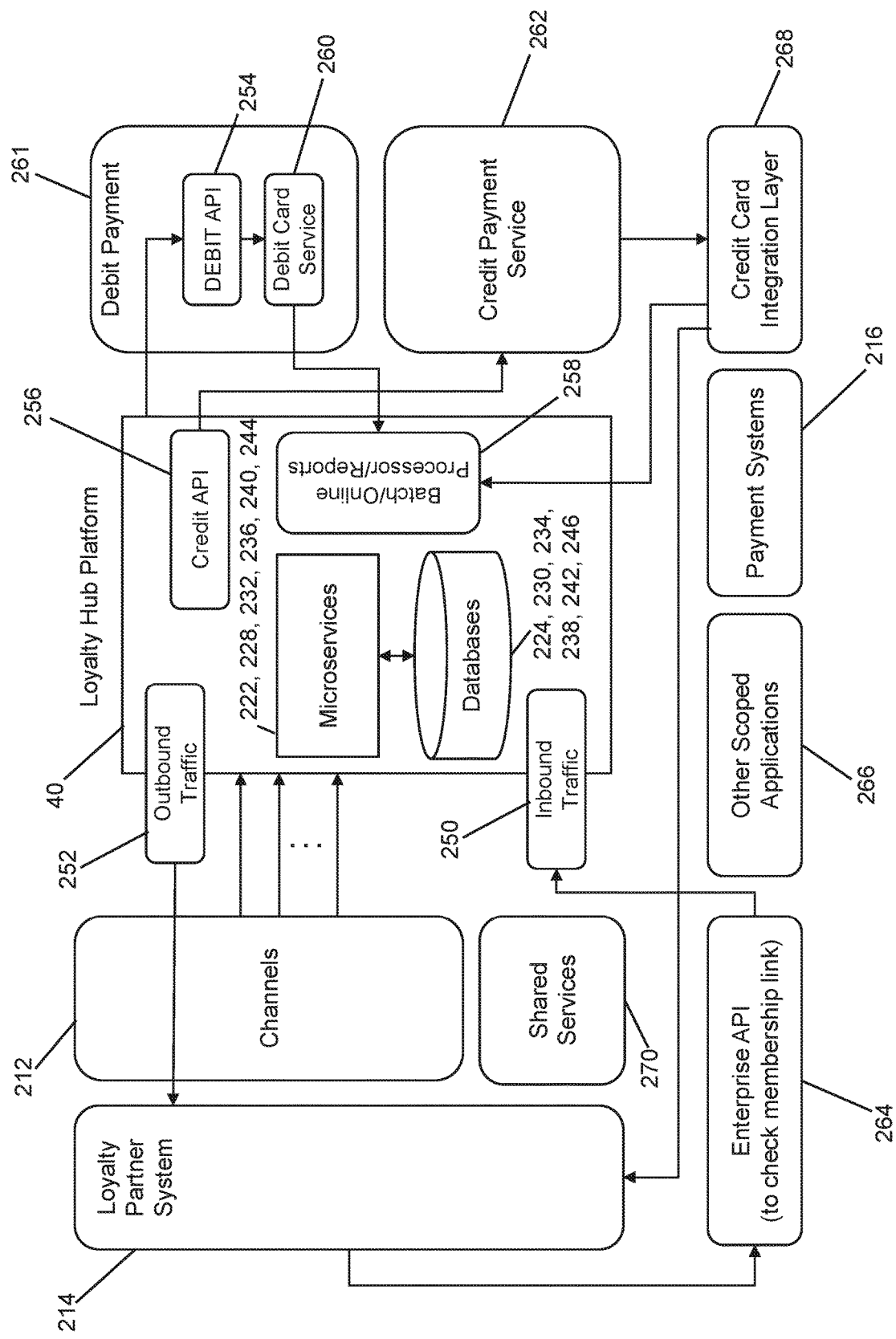
FIG. 13 is a block diagram illustrating the integration of the loyalty hub platform with a loyalty partner system, enterprise system, and payment infrastructure.

FIG. 13 provides an architectural configuration for the loyalty hub platform 40 to illustrate the integration with a loyalty partner system 214, a debit payment service 261, and a credit payment service 262 (e.g., TSYS). The debit and credit payment services 261, 262 are coupled to a batch/online processor/reports service 258 in the loyalty hub platform 40 to enable the platform 40 to detect payment events. Also shown in FIG. 13 is a credit card integration layer 268 and the payment systems 216 such as Interac®, Visa®, Mastercard®, etc. The architecture in FIG. 13 also enables other scoped applications 266 to be integrated with the services orchestrated by the loyalty hub platform 40. An enterprise API 264 is also shown, which provides a merchant application or other service within a loyalty partner system 214 to check membership links with the loyalty hub platform 40. The enterprise channels 212 and shared services 270 (e.g., knowledge management systems) an also integrate the loyalty partner systems 214 with the loyalty hub platform 40.

The loyalty hub platform 40 provides synchronous communication of the microservices 222, 228, 232, 236, 240, 244 and orchestration with each other. In this configuration, a service calls a REST API 226 that another service exposes, and the caller waits for a response from the receiver. An inbound traffic service 250 is shown, which can take the form of a service, microservice, API or other interface mechanism. The inbound traffic service 250 handles inbound data from the loyalty partner system(s) 214 via the enterprise API 264. Similarly, an outbound traffic service 252 is provided, which can take the form of a service, microservice, API or other interface mechanism. The outbound traffic service 252 handles data that is sent back to the loyalty partner system(s) 214 via the enterprise channel(s) 212 such as via a mobile or web application. The batch/online processor/reports service 258 monitors events from the payment systems 216, such as debit or credit transactions with cards that may be associated with the linked loyalty programs, via the credit card integration layer 268.

Data received at the inbound traffic service 250 as well as events detected by the batch/online process/reports service 258 (e.g., LCM event data) are read by the microservices, including the redemption service 228. Data received at the inbound traffic service 250 may, along with other outputs from the microservices, flow to a credit API 256 (e.g., TSYS) to be communicated to a credit card payment service 262. Similarly, various events such as eligibility redemptions can be communicated to a debit card payment system 261 via a debit API 254. Delinking events, eligibility redemption and other events may also feed to the outbound traffic service 252 to communicate events back to the associated loyalty partner system 214. The individual microservices and corresponding database records can be used to dynamically handle events both synchronously and asynchronously. In this way, multiple loyalty partners 214 can be integrated into the loyalty hub platform 40 independently without requiring batch processing or being susceptible to failovers and outages on one particular service.

Figure 14A:
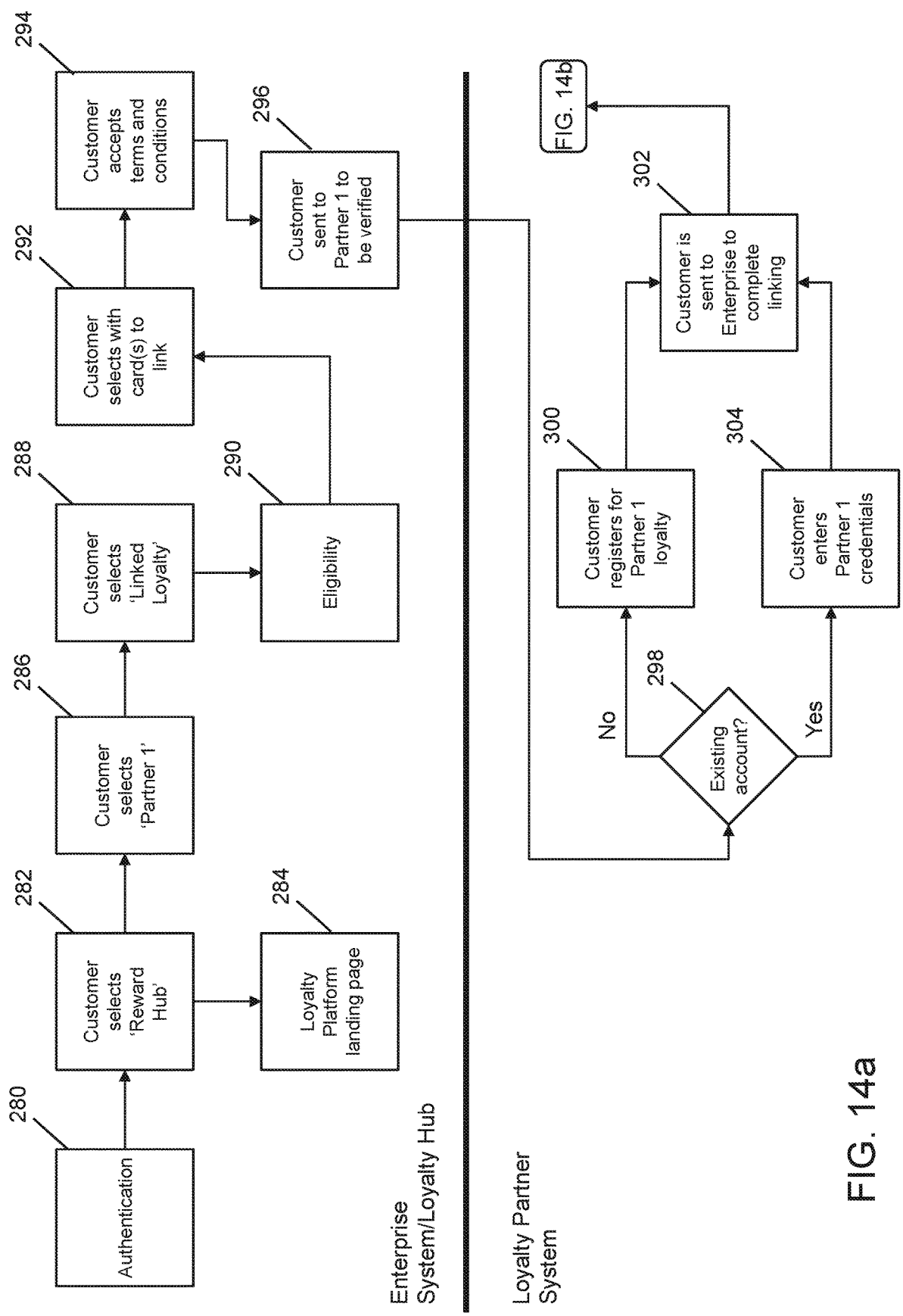
FIGS. 14a and 14b are a flow diagram of an example of computer executable instructions for linking loyalty programs via the loyalty hub platform.
Figure 14B:
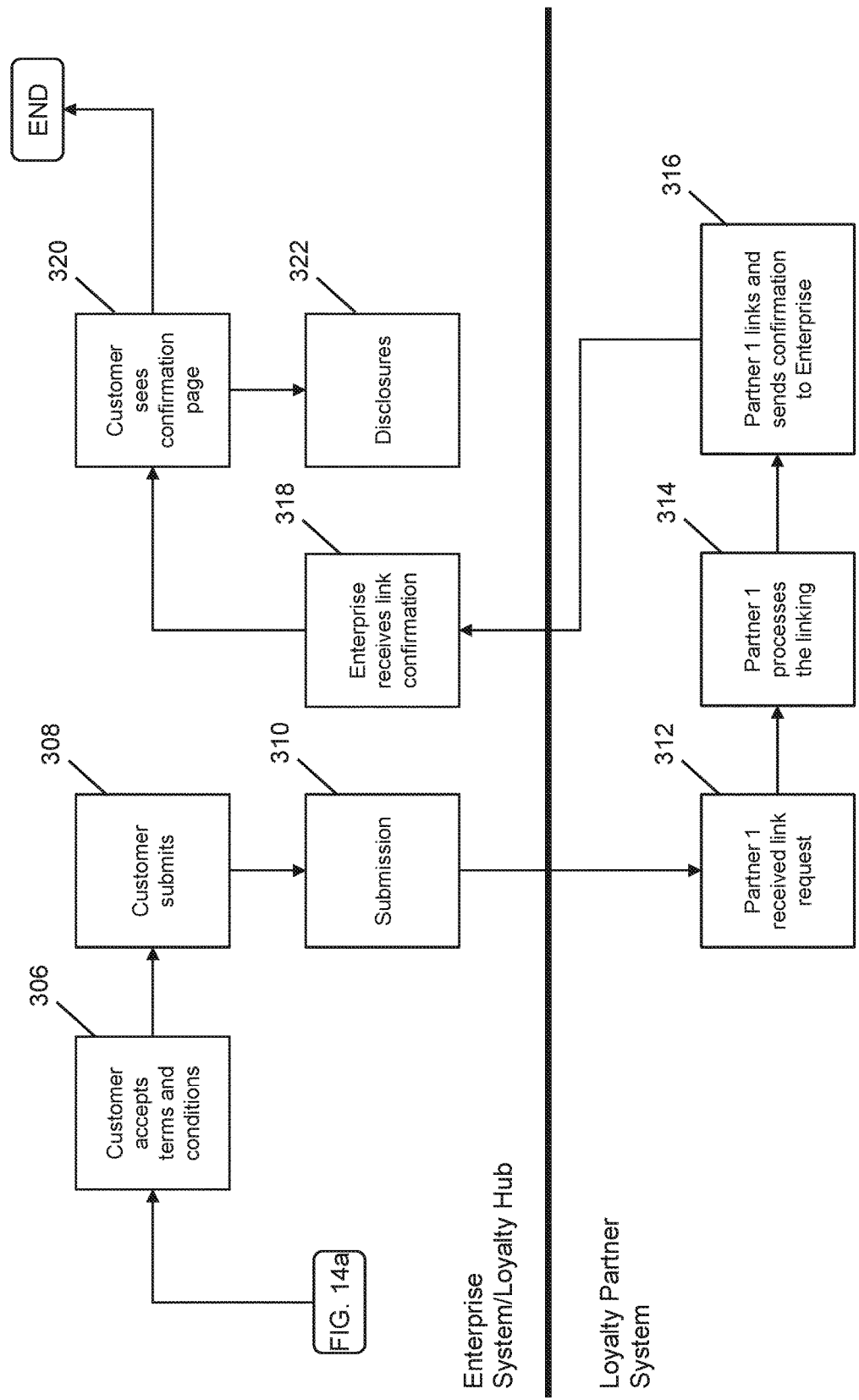

Turning now to FIGS. 14*a* and 14*b*, a flow diagram is provided to illustrate linking loyalty programs via the loyalty hub platform 40. Beginning with FIG. 14*a*, after an authentication operation at 280 the customer selects a Reward Hub option, tab, page, etc. at 282 which brings them to a Loyalty Platform landing page at 284. The customer can then select a loyalty partner, in this example Partner 1 at 286 and select an option to enable Linked Loyalty at 288. This generates an eligibility list at 290, e.g., of payment and credit cards that are eligible for linked loyalty, allowing the customer to select the card(s) to link at 292. The customer can then accept terms and conditions at 294 (and/or any additional operations required to move forward) and the customer is navigated to Partner 1 to be verified by connecting into the associated loyalty partner system 214. At the loyalty partner system 214, the loyalty partner determines at 298 if the customer has an existing account with them. If not, the customer is registered for Partner 1's loyalty program at 300. If the customer is registered, the customer is asked to enter their credentials at 304. The customer is then sent to the enterprise system 16 or loyalty hub platform 40 at 302 to complete the linking as shown in FIG. 14*b*.

Referring now to FIG. 14*b*, at the enterprise system 36 or loyalty hub platform the customer accepts terms and conditions at 306 and selects a submit option at 308. This results in a submission made at 310 back to the loyalty partner system 214. At 312 Partner 1 receives a link request and processes the linking operation at 314. Partner 1 then links the loyalty accounts and sends a confirmation to the enterprise at 316, e.g., by communicating with the enterprise system 36 or loyalty hub platform 40. At 318 the enterprise receives the link confirmation and displays a confirmation page to the customer 210 at 320. At 322 a disclosures operation can be performed, e.g., to make any necessary disclosures to the customer 210.

Figure 15A:
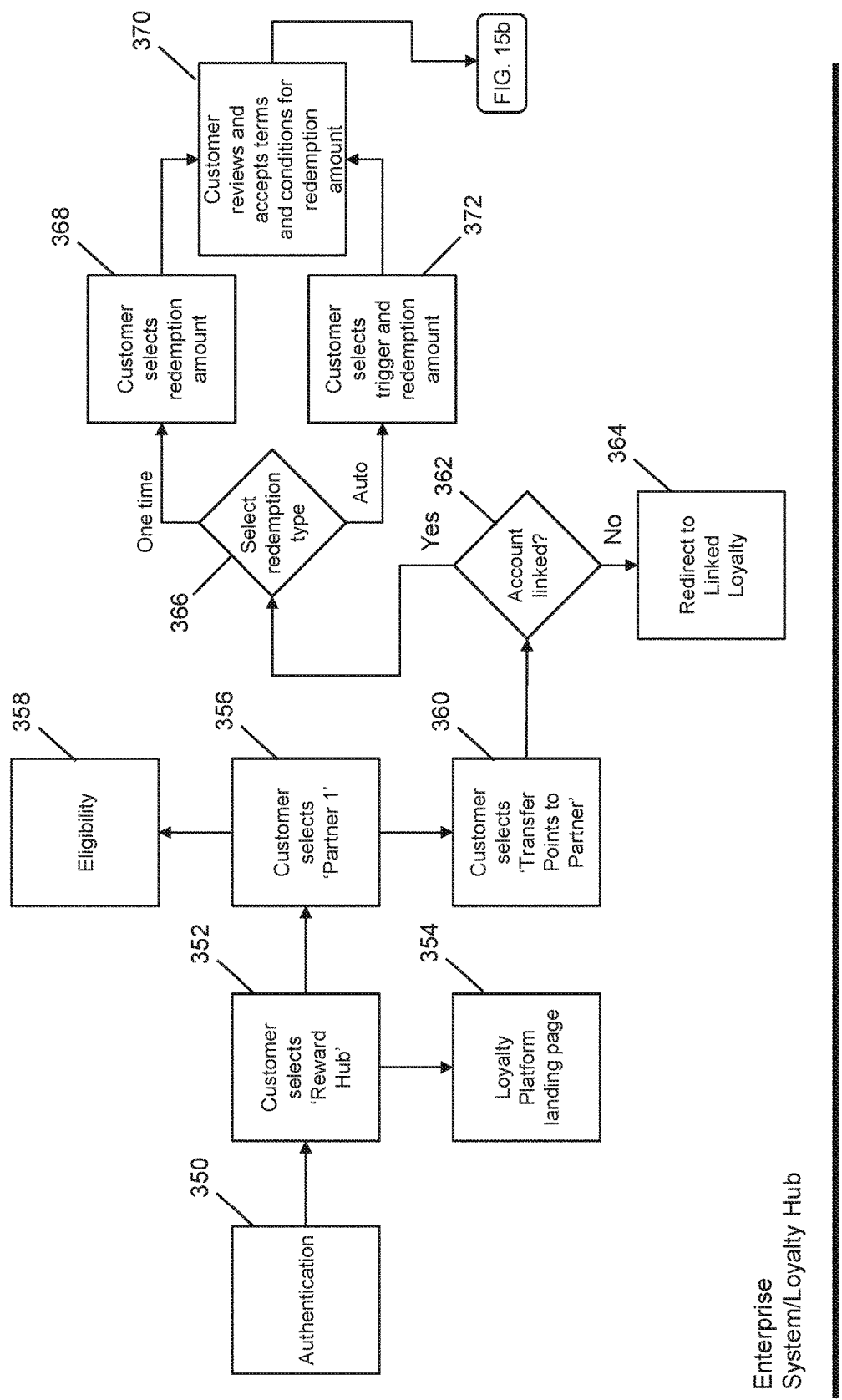
FIGS. 15a and 15b are a flow diagram of an example of computer executable instructions for transfer loyalty points to a loyalty partner.
Figure 15B:
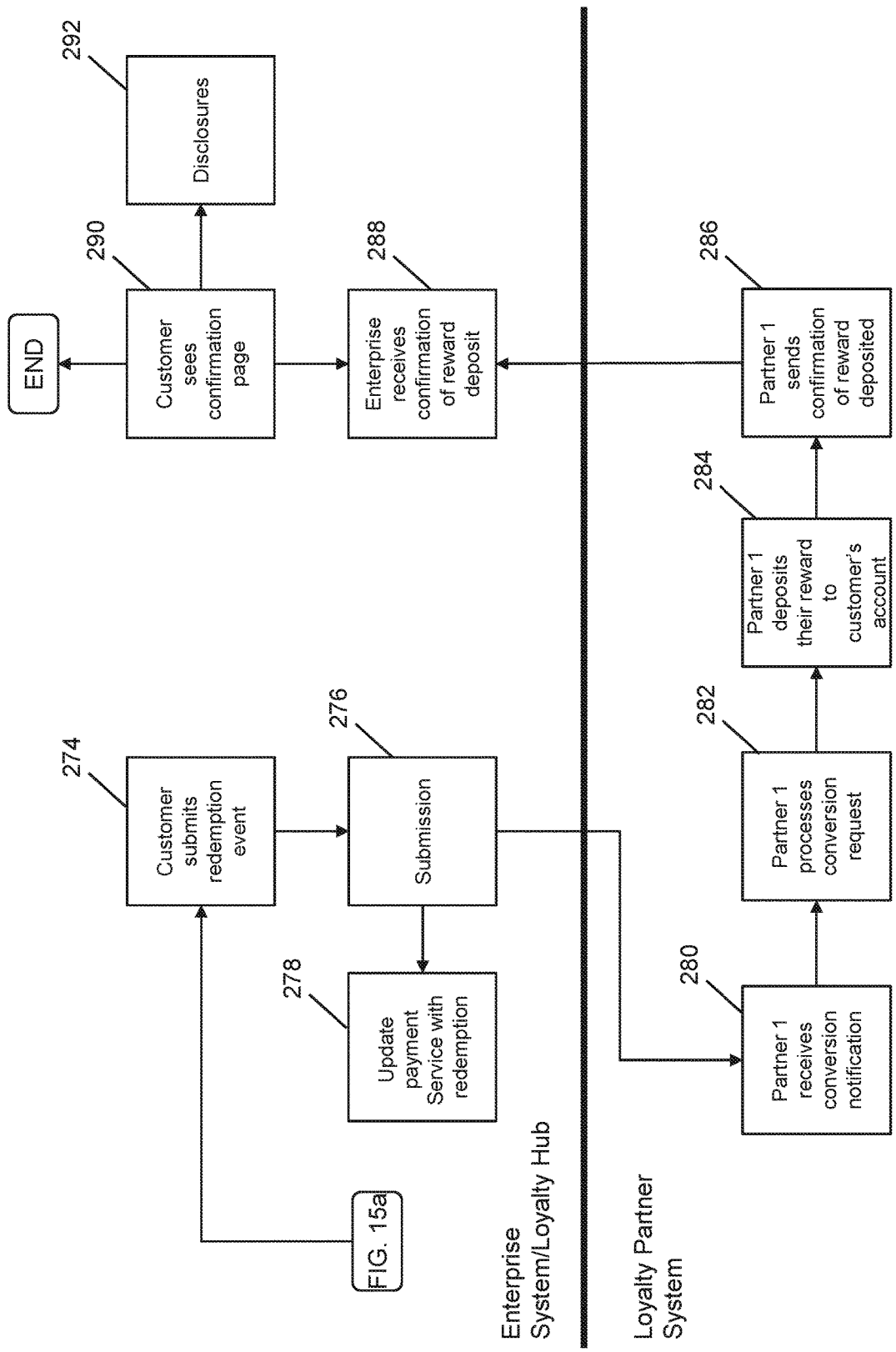

FIGS. 15*a* and 15*b* provide a flow diagram for transferring loyalty points to a loyalty partner. Referring first to FIG. 15*a*, after an authentication operation at 350 the customer selects a Reward Hub option, tab, page, etc. at 352 which brings them to a Loyalty Platform landing page at 354. The customer can then select a loyalty partner, in this example Partner 1 at 356, which calls an eligibility process at 358 to determine the customer's eligibility to transfer loyalty points. At 360 the customer selects a "Transfer Points to Partner" option, which causes the loyalty hub platform 40 to determine if the account is linked with that partner loyalty program at 362. If not, the customer 210 is redirected to the linked loyalty flow in FIGS. 14*a* and 14*b* at 364. If the customer 210 is linked to that partner, the customer can select a redemption type at 366. In this example, the redemption types can include one time or automatic (auto) redemption. If selecting a one-time redemption the customer selects the redemption amount at 368. If the selecting an auto redemption the customer selects a trigger and the redemption amount when that trigger is detected at 372. The customer 210 then reviews and accepts any terms and conditions for the redemption amount at 370 and the process proceeds to FIG. 15*b*.

Referring now to FIG. 15*b*, the customer submits the redemption event at 374 and the submission is made at 376 causing the payment service (e.g., TSYS) to be updated with the redemption amount at 378. Partner 1 then receives a conversion notification at 380 and processes the conversion request at 382. Partner 1 then deposits the reward to the customer's account in their loyalty program at 384 and sends a confirmation of reward deposited to the loyalty hub platform 40 at 386. The enterprise (e.g., at loyalty hub platform 40) receives the confirmation at 388 and the confirmation page is displayed to the customer at 390. At 392 a disclosures operation can be performed, e.g., to make any necessary disclosures to the customer 210.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for managing loyalty rewards, the device comprising:
a processor; and
a memory coupled to the processor, the memory storing computer executable instructions that when executed by the processor cause the processor to:
gather, using an add-in integrated with a transaction channel, transaction data associated with a transaction being conducted by the device via the transaction channel;
receive, from the add-in, the transaction data at a loyalty management engine interposed between the device and one or more loyalty system;
compare, at the loyalty management engine, the transaction data with information about the one or more loyalty systems, that to determine whether the transaction is eligible for a loyalty reward if completed via a different transaction channel with which the add-in is integrated;
in response to detecting eligibility via the different transaction channel,
interrupt the transaction being conducted via the transaction channel;
redirect the transaction to the different transaction channel, and modify the transaction using loyalty account information that is eligible to obtain the loyalty reward;
generate a prompt for confirmation of the transaction via the different transaction channel; and
in response to detecting confirmation of the prompt, enable the transaction to be completed with the different transaction channel to obtain the loyalty reward.

2. The device of claim 1, wherein the transaction is modified by automatically adding the loyalty account information eligible to obtain the loyalty reward to the transaction.

3. The device of claim 1, wherein the transaction is interrupted by the add-in.

4. The device of claim 1, wherein the computer executable instructions further cause the processor to:
enable at least one loyalty alert to be executed based on at least one alert criterion.

5. The device of claim 4, wherein the at least one alert criterion specifies whether to monitor the transaction data based on i) a transaction type and/or ii) the transaction channel.

6. The device of claim 4, wherein the at least one alert criterion specifies to display the prompt when the transaction is one of: being executed, is about to be executed or, has been executed.

7. The device of claim 1, wherein the prompt is displayed in an e-commerce checkout window prior to completing the transaction.

8. The device of claim 1, wherein the prompt comprises at least one of options to cancel the transaction or redirect the transaction to the different transaction channel.

9. The device of claim 1, wherein the device is in communication with a loyalty platform providing at least one function of a loyalty tracking application and/or at least one function of a loyalty wallet application.

10. The device of claim 9, wherein the loyalty platform is integrated with an enterprise system to link a first loyalty program associated with the at least one transaction channel, the first loyalty program being associated with the enterprise system, with at least one second loyalty program associated with the different transaction channel, the second loyalty program being associated a loyalty partner system.

11. The device of claim 1, wherein the computer executable instructions further cause the processor to:
determine a notification to be sent to a client device conducting the transaction via the different transaction channel, using a machine learning system trained to determine when to send notifications and alerts.

12. A method of managing loyalty rewards, the method executed by a device and comprising:
    gathering, using an add-in integrated with a transaction channel, transaction data associated with a transaction being conducted by the device via the transaction channel;
    receiving, from the add-in, the transaction data at a loyalty management engine interposed between the device and one or more loyalty system;
    comparing, at the loyalty management engine, the transaction data with information about the one or more loyalty systems to determine whether the transaction is eligible for a loyalty reward if completed via a different transaction channel with which the add-in is integrated;
    in response to detecting eligibility via the different transaction channel,
        interrupting the transaction being conducted via the transaction channel;
        redirecting the transaction to the different transaction channel, and modifying the transaction using loyalty account information that is eligible to obtain the loyalty reward;
        generating a prompt to obtain confirmation for the transaction via the different transaction channel; and
        in response to detecting confirmation of the prompt, enabling the transaction to be completed with the different transaction channel to obtain the loyalty reward.

13. The method of claim 12, wherein the transaction is interrupted by the add-in.

14. The method of claim 12, wherein the transaction is modified by automatically adding the loyalty account information eligible to obtain the loyalty reward to the transaction.

15. The method of claim 12, further comprising:
    enabling at least one loyalty alert to be executed based on at least one alert criterion.

16. The method of claim 15, wherein the at least one alert criterion specifies whether to monitor the transaction data based on i) a transaction type and/or ii) the transaction channel.

17. The method of claim 15, wherein the at least one alert criterion specifies to display the prompt when the transaction is one of: being executed, is about to be executed or, has been executed.

18. The method of claim 12, wherein the device is in communication with a loyalty platform providing at least one function of a loyalty tracking application and/or at least one function of a loyalty wallet application.

19. The method of claim 18, wherein the loyalty platform is integrated with an enterprise system to link a first loyalty program associated with the transaction channel, the first loyalty program being associated with the enterprise system with at least one second loyalty program associated with the different transaction channel, the second loyalty program being associated a loyalty partner system.

20. A non-transitory computer readable medium for managing loyalty program accounts, the computer readable medium comprising computer executable instructions for:
    gathering, using an add-in integrated with a transaction channel, transaction data associated with a transaction being conducted by the device via the transaction channel;
    receiving, from the add-in, the transaction data at a loyalty management engine interposed between the device and one or more loyalty system;
    comparing, at the loyalty management engine, the transaction data with information about the one or more loyalty systems to determine whether the transaction is eligible for a loyalty reward if completed via a different transaction channel with which the add-in is integrated;
    in response to detecting eligibility via the different transaction channel,
        interrupting the transaction being conducted via the transaction channel;
        redirecting the transaction to the different transaction channel, and modifying the transaction using loyalty account information that is eligible to obtain the loyalty reward;
        generating a prompt to obtain confirmation for the transaction via the different transaction channel; and
        in response to detecting confirmation of the prompt, enabling the transaction to be completed with the different transaction channel to obtain the loyalty reward.

* * * * *